United States Patent
Ciccone et al.

(10) Patent No.: US 7,261,553 B2
(45) Date of Patent: Aug. 28, 2007

(54) CROSSOVER NOZZLE SYSTEM FOR STACK MOLDS

(75) Inventors: Vince Ciccone, Kleinberg (CA); John M. Plut, Kitchener (CA); Petrica Maran, Mississauga (CA)

(73) Assignee: Injectnotech Inc., Mississauga, Ontario (CA)

( * ) Notice: Subject to any disclaimer, the term of this patent is extended or adjusted under 35 U.S.C. 154(b) by 319 days.

(21) Appl. No.: 11/102,566

(22) Filed: Apr. 8, 2005

(65) Prior Publication Data

US 2005/0238758 A1    Oct. 27, 2005

Related U.S. Application Data

(60) Provisional application No. 60/561,053, filed on Apr. 9, 2004.

(51) Int. Cl.
B29C 45/22    (2006.01)
(52) U.S. Cl. .................................. 425/572; 425/588
(58) Field of Classification Search ............... 425/572, 425/588
See application file for complete search history.

(56) References Cited

U.S. PATENT DOCUMENTS

| | | | |
|---|---|---|---|
| 4,303,382 A | | 12/1981 | Gellert |
| 4,309,163 A | * | 1/1982 | Cottancin .................... 425/543 |
| 4,330,257 A | * | 5/1982 | Rees et al. .................. 425/556 |
| 4,599,064 A | * | 7/1986 | Landis et al. ............... 425/185 |
| 5,069,615 A | * | 12/1991 | Schad et al. ................ 425/556 |
| 5,324,192 A | * | 6/1994 | Zakich ........................ 425/575 |
| 5,522,720 A | | 6/1996 | Schad |
| 5,773,049 A | * | 6/1998 | Kashiwa et al. ............ 425/572 |
| 5,846,472 A | * | 12/1998 | Rozema et al. ........... 264/297.2 |
| 6,409,955 B1 | | 6/2002 | Schmitt et al. |
| 6,575,731 B1 | * | 6/2003 | Olaru et al. ................ 425/564 |
| 6,835,060 B2 | * | 12/2004 | Sicilia ......................... 425/572 |
| 6,852,265 B2 | * | 2/2005 | Olaru et al. ............. 264/328.8 |
| 6,955,534 B2 | * | 10/2005 | Dewar ......................... 425/564 |
| 7,122,145 B2 | * | 10/2006 | Olaru et al. ............. 264/328.8 |
| 7,128,565 B2 | * | 10/2006 | DiSimone et al. .......... 425/557 |
| 2003/0206987 A1 | | 11/2003 | George et al. |

FOREIGN PATENT DOCUMENTS

| | | | |
|---|---|---|---|
| CA | | 2407163 A1 | 4/2004 |
| CA | | 2416895 A1 | 7/2004 |
| WO | WO 2005/025833 A1 | | 3/2005 |

* cited by examiner

*Primary Examiner*—Tim Heitbrink
(74) *Attorney, Agent, or Firm*—Townsend and Townsend and Crew LLP

(57) ABSTRACT

A crossover nozzle system for transferring molten plastic from an inlet at the center of the stationary platen of an injection machine to the main manifold of the molding chambers of the stack molds of the injection molding machine. The nozzle system has a sprue bar, a sprue bar extension adjustably connected with the sprue bar, the sprue bar extension having a transfer chamber. The nozzle system also has symmetrically placed inlet apertures located in the sprue bar, the apertures are configured to be in fluid communication centrally with the transfer chamber in the sprue bar extension, and a shut-off surface configured to seal the transfer chamber from the inlet apertures.

42 Claims, 32 Drawing Sheets

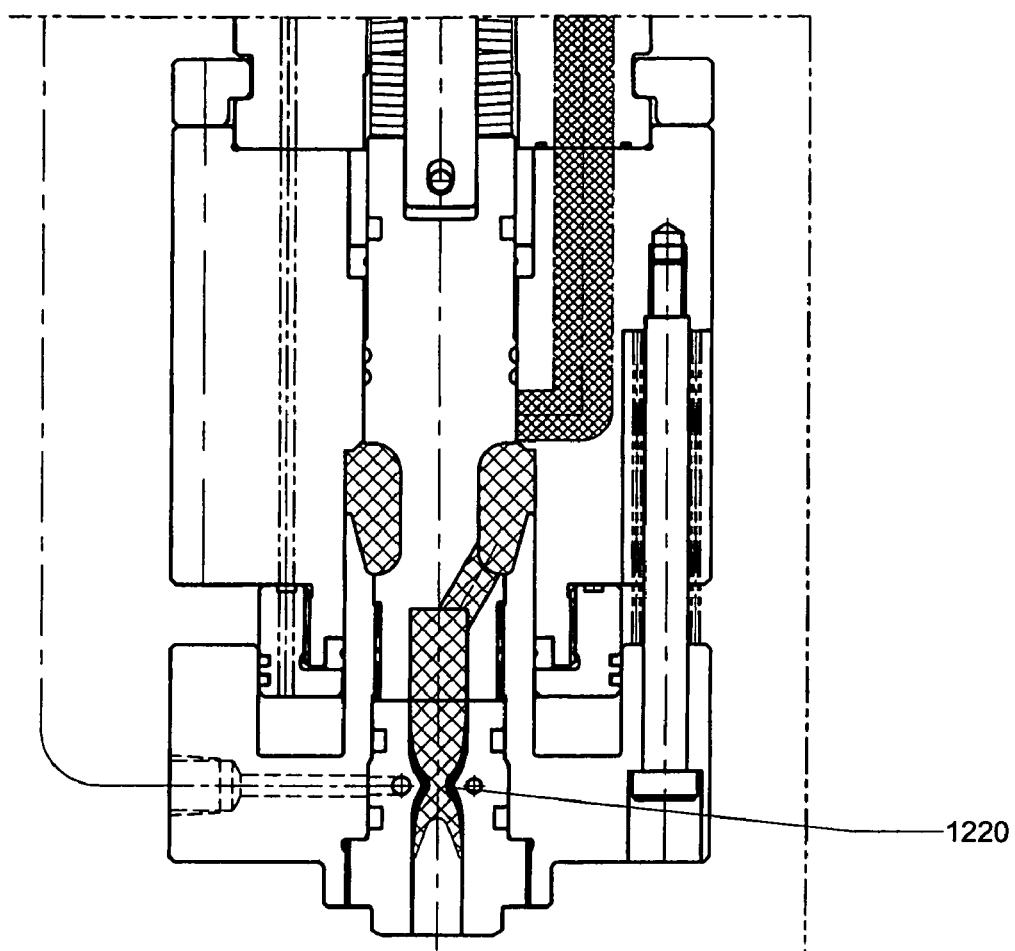
Fig. 32
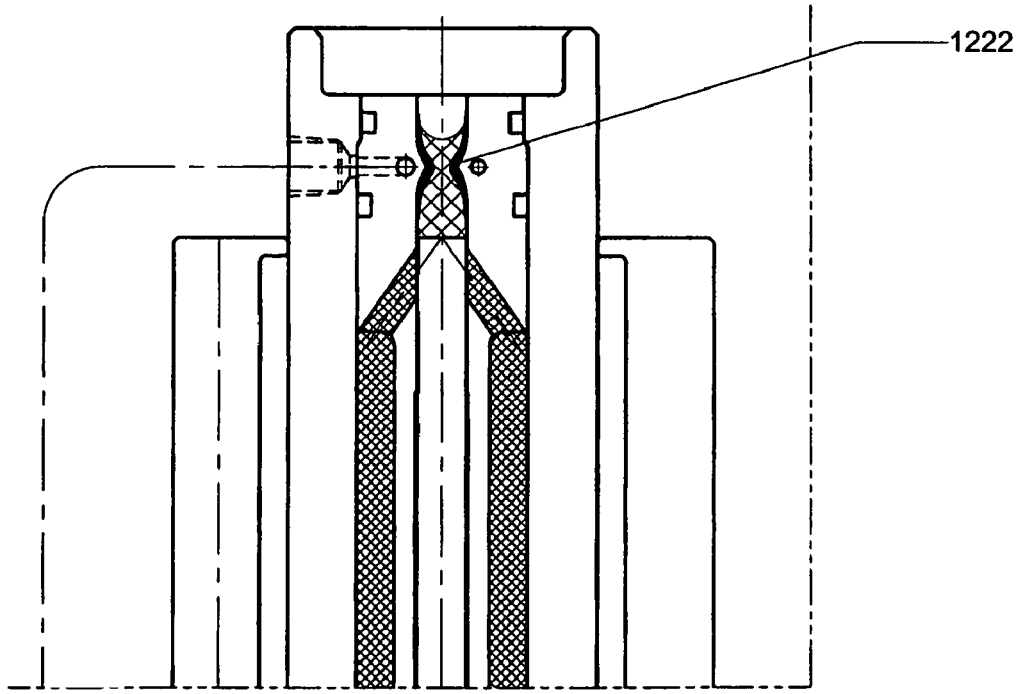

CROSSOVER NOZZLE SYSTEM FOR STACK MOLDS

CROSS-REFERENCES TO RELATED APPLICATIONS

This application claims priority to U.S. Provisional Patent Application No. 60/561,053, filed Apr. 9, 2004, the disclosure of which is hereby incorporated by reference herein in its entirety for all purposes.

BACKGROUND OF THE INVENTION

The present invention relates to injection molding machines, and in particular, to a system that transports molten plastic to molding chambers of stack molds in an off-center location, or when the transfer of the molten plastic needs to be in the center of the mold as in a split sprue bar.

For injection molds having two or more cavities, it is desired to ensure that molten plastic reaches all molding chambers at the approximately same time, or at least such that preferential flow to any one of the molding chambers is minimized. For most injection molds, molten plastic is transferred from the stationary machine platen to the stationary side of the injection mold and to the molding chamber(s). For stack molds as the one shown in FIG. 1 (prior art), molten plastic is transferred through the sprue, into a long sprue bar extending to the manifold, located in the center of the mold, which then transfers it equally to all cavities involved.

However, for stack molds as the ones shown in FIG. 2 (prior art) and FIG. 3 (prior art), where the centerline of molding chambers coincides with centerline of mold, molten plastic cannot reach the manifold directly along the centerline, but rather must take a detour route and enter the manifold at an offset location. For such stack molds, a system is needed to ensure a proper flow of molten plastic to the molding chambers.

BRIEF SUMMARY OF THE INVENTION

The embodiments of the present invention provide a system that transfers molten plastic from the inlet at the center of stationary platen of injection machine, through a feeder manifold and an off-center crossover nozzle, to the main manifold of the stack mold. The embodiments of the present invention are especially valuable when transfer of molten plastic directly along the centerline of mold is not possible, or when the transfer of molten plastic is in the center of the mold as a split sprue bar.

For a further understanding of the nature and advantages of the invention, reference should be made to the following description taken in conjunction with the accompanying drawings.

BRIEF DESCRIPTION OF THE DRAWINGS

FIG. 32 is an enlarged section detail of the central portion of FIG. 31, showing the opening of the crossover nozzle system between injection cycles.

DETAILED DESCRIPTION OF THE INVENTION

Figure 1:
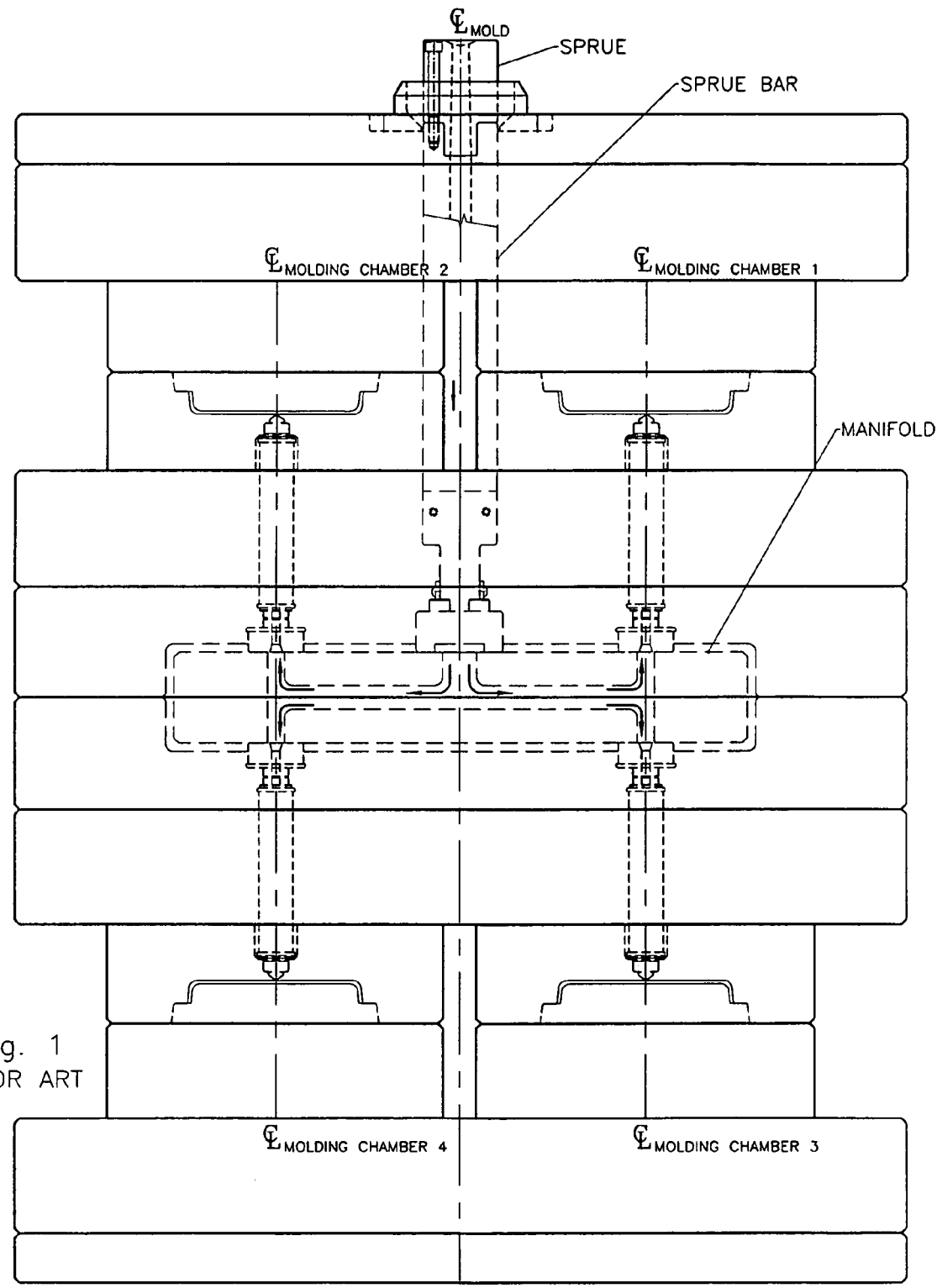
FIG. 1 is an exemplary diagram of a prior art stack mold.
Figure 2:
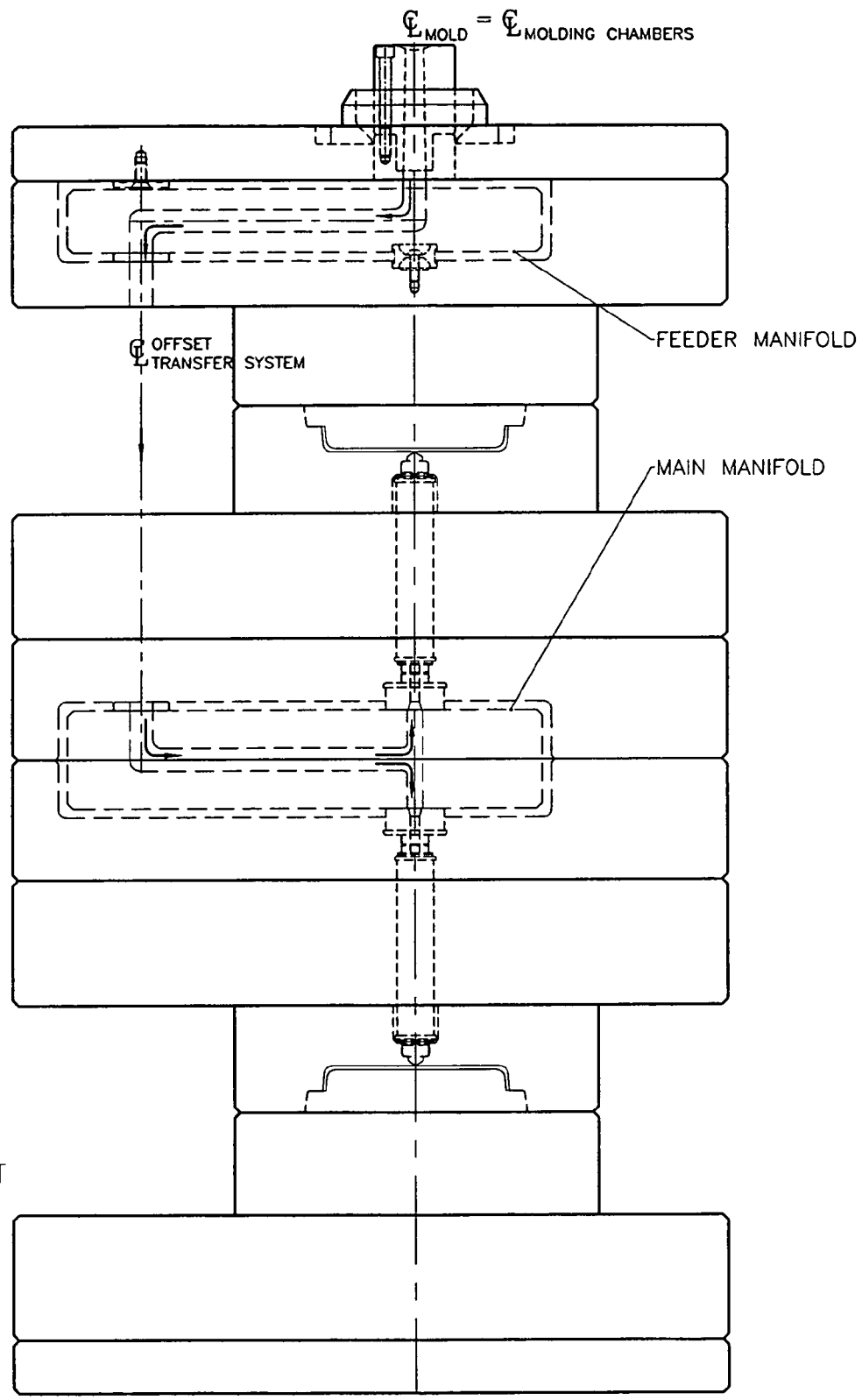
FIGS. 2-3 are exemplary diagrams of prior art stack molds where the centerline of molding chambers coincides with centerline of the mold.
Figure 3:
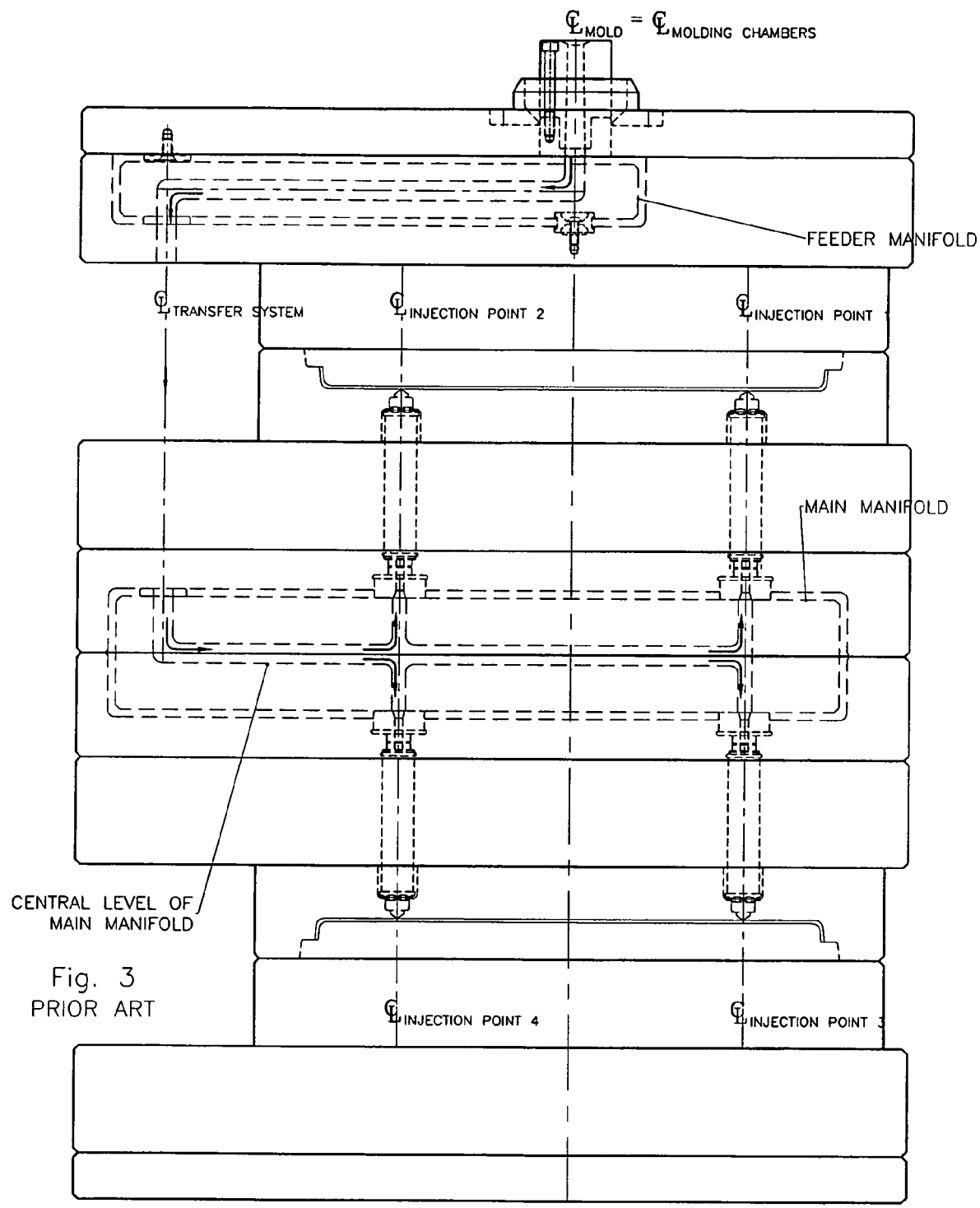
Figure 4:
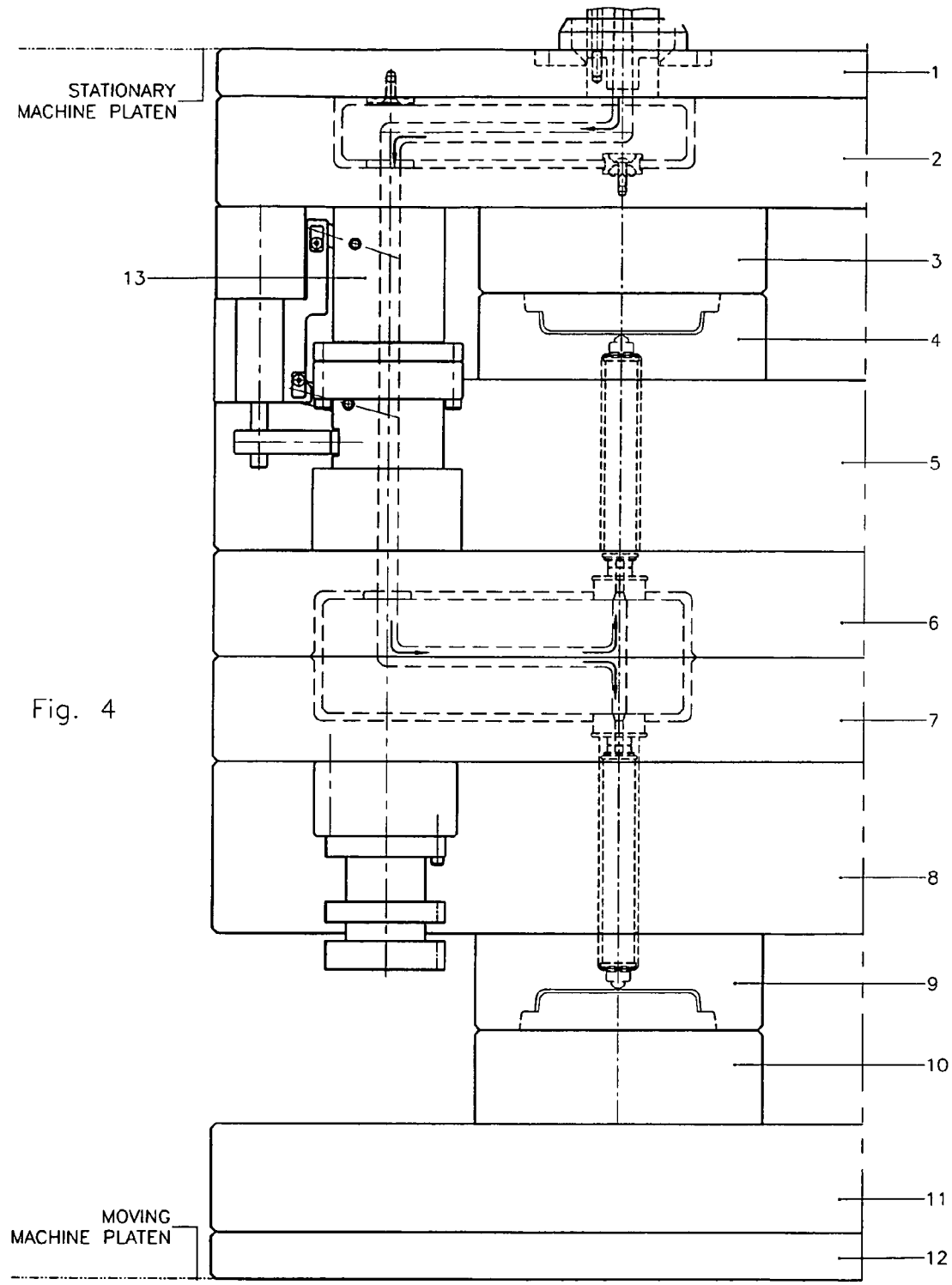
FIG. 4 is an exemplary partial view of one embodiment of a crossover nozzle system in accordance with the present invention, shown with the mold closed.

With reference to FIGS. 4 through 18, a stack mold that may be configured to use the crossover nozzle system in accordance with the embodiment of the present invention includes of a top plate 1, feeder plate/stationary core plate 2, stationary core 3, stationary cavity 4, stationary cavity plate 5, stationary manifold plate 6, moving manifold plate 7, moving cavity plate 8, moving cavity 9, moving core 10, moving core plate 11, bottom plate 12 and crossover nozzle system 13. It should be understood that fewer or more mold plates or blocks may be employed depending on specific design requirements.

Stationary core 3 is secured to feeder plate 2, which is secured to top plate 1. Top plate 1 is bolted to stationary machine platen. Similarly, moving core 10 is secured to moving core plate 11, which is secured to bottom plate 12. Bottom plate 12 is bolted to moving machine platen. Stationary cavity 4 is secured to stationary cavity plate 5, which is secured to stationary manifold plate 6. Moving cavity 9 is secured to moving cavity plate 8, which is secured to moving manifold plate 7. Stationary manifold plate 6 and moving manifold plate 7 are secured together. So, the mold has three main portions: a core side attached to the stationary machine platen (e.g., this portion is stationary), another core side attached to the moving machine platen (this portion opens for a double stroke, once for each mold cycle), and a central portion containing the cavity sides (which rides on the machine tie bars and opens for a full stroke, once for each mold cycle). At the end of each mold cycle, the mold opens equally on both sides to release the molded parts.

As used herein, the term "stack mold" refers to a two-level stack mold. However, the crossover nozzle design in accordance with the embodiments of the present invention can be used within a three-level or a four-level stack mold, with some alteration to its configuration, but using the same design concept as described herein. Furthermore, the crossover nozzle system may be used in the context of a reverse-gated stack mold, where the cores and cavities are reversed such that cavities are secured to machine platen portions and cores are secured to the central portion of the mold. In such cases, injection takes place from the core side, which is sometimes necessary, for example if the outer side (cavity side) of the molded article must be free of any bumps for aesthetic or functional reasons.

Figure 5:
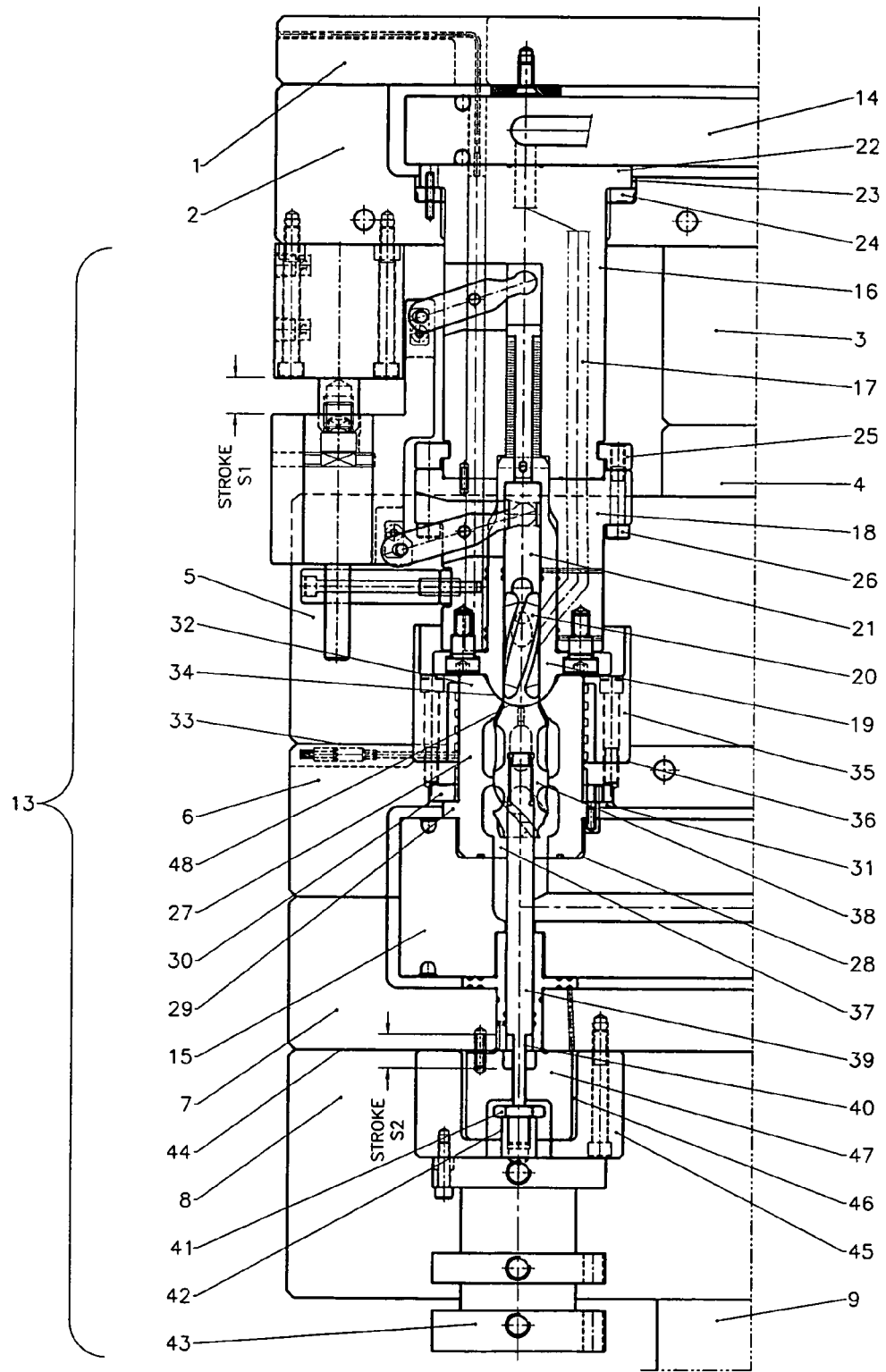
FIG. 5 is an exemplary partial cross-section view of one embodiment of a crossover nozzle system, shown with sprue valve closed and mold closed.

Shown in FIG. 5, one embodiment of the crossover nozzle system 13 transfers molten plastic from feeder manifold 14 to main manifold 15 through a succession of components. From feeder manifold 14, plastic enters the primary sprue bar 16 through holes 17. It continues on, through primary sprue bar extension 18, into a floating sprue 19. From here, plastic is transferred into a number of spiral grooves 20 of a primary sprue valve. Flange 22 of primary sprue bar 16, located in a pocket 23 in feeder plate 2, is pressed between feeder manifold 14 on one side, and a primary pressure ring 24, also located in pocket 23, on opposite side. A pressure pad is used as backing for the feeder manifold 14, in line with the crossover nozzle 13, to transfer the injection pressures to the top plate 1. This is a safety measure designed to avoid deflection of the manifold as can be caused by the high pressures of the crossover nozzle system 13. Split-ring connectors 25 and bolts 26 secure primary sprue bar extension 18 to primary sprue bar 16.

A secondary sprue 27 is installed in a pocket 28 in main manifold 15. Annular flange 29 of secondary sprue 27 is pressed between main manifold 15 on one side, and a secondary pressure ring 30 on opposite side, secondary pressure ring 30 being installed in a pocket 31 in stationary manifold plate 6. Opposite end 32 of secondary sprue 27 extends beyond surface 33 of stationary manifold plate 6, and comes in contact with floating sprue 19 along a spherical surface 34. A secondary sprue locating ring 35, secured in a pocket 36 on surface 33 of stationary manifold plate 6, surrounds end 32 of secondary sprue 27 and centers it into position. Beyond the spherical surface 34, secondary sprue 27 has a central hole 37 in which a secondary sprue valve 38 can slide. Secondary sprue valve 38 is activated by an extension rod 39. At the opposite end, extension rod 39 has two flat surfaces 40 and is in contact with a T-coupling 41, secured to the piston 42 of a pneumatic cylinder 43. Pneumatic cylinder 43 is connected to moving manifold plate 7 through a cylinder support 45, mounted onto surface 44 of moving manifold plate 7. Also mounted to moving manifold plate 7, and housed in a pocket 46 in cylinder support 45, is an extension rod stop 47. Piston 42 of pneumatic cylinder 43 is always activated forward. The functioning of this cylinder is explained below in further detail.

Figure 6:
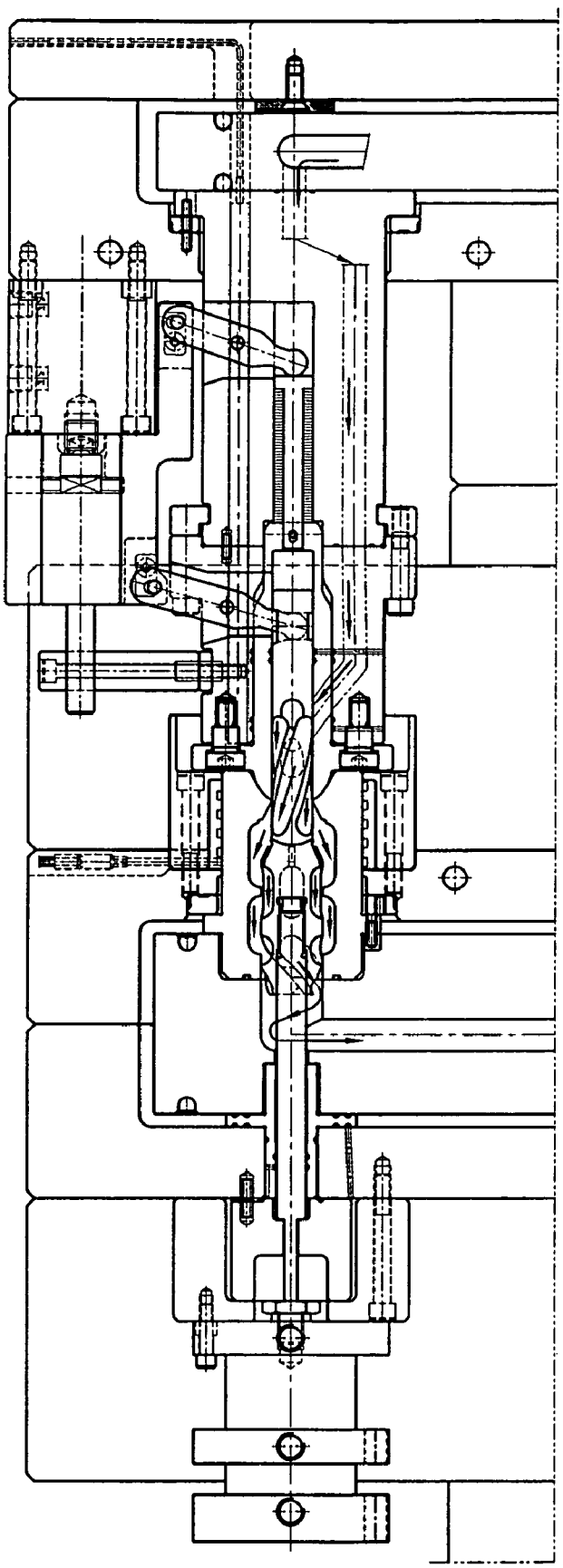
FIG. 6 is a partial cross-section view similar to FIG. 5, shown with sprue valve open and mold closed.

Primary sprue valve 21 and secondary sprue valve 38 have contact along a spherical surface 48, of equal radius as spherical surface 34. Primary sprue valve 21 and secondary sprue valve 38 are the main moving parts of the cross-over nozzle 13, extending/retracting once per mold cycle, to allow/restrict the flow of molten plastic from feeder manifold 14 to main manifold 15. FIG. 6 shows the crossover nozzle system with the sprue valve extended (open). The flow of molten plastic is shown with arrows, from feeder manifold 14, through primary sprue bar 16, primary sprue bar extension 18, floating sprue 19 and primary sprue valve 21, into secondary sprue 27 and secondary sprue valve 38, which transfer it into the main manifold 15.

Figure 7:
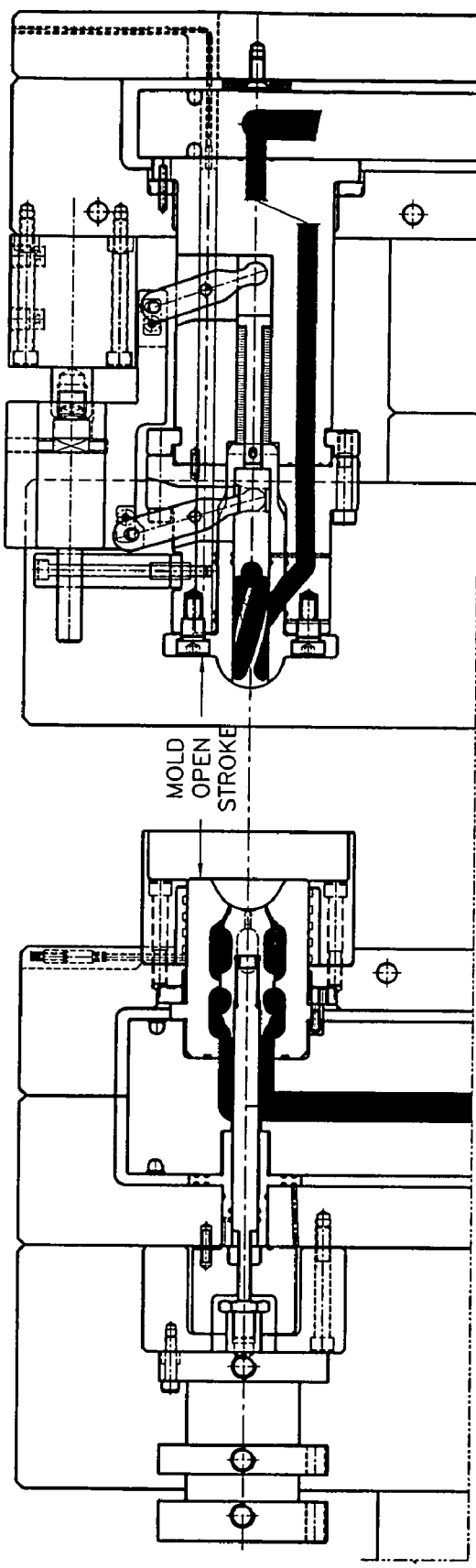
FIG. 7 is a partial cross-section view of the crossover nozzle system of FIG. 5, shown with mold open. Valves are closed on both sides, to prevent plastic leakage.

FIG. 7 shows the position of crossover nozzle components when the mold is open. Both primary sprue valve 21 and secondary sprue valve 38 are closed to prevent plastic leakage outside the system. Hatched (filled) areas represent molten plastic, present throughout the system in flow channels and linear/spiral grooves, but sealed inside the system.

Figure 8:
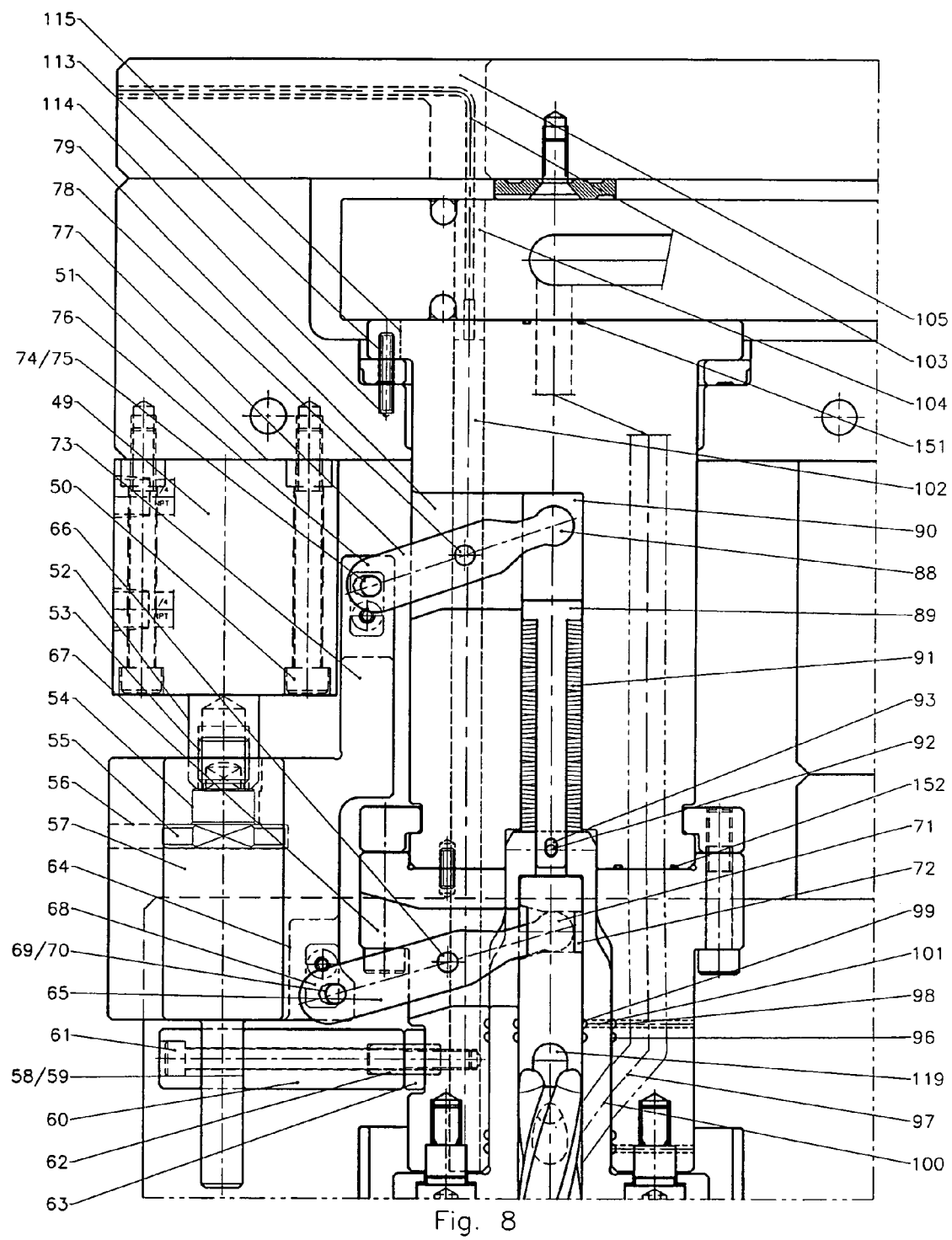
FIG. 8 is a cross-section detail of the top portion (primary side) of the crossover nozzle system of FIG. 5.

As shown in FIG. 8, the primary sprue valve 21 is activated by a hydraulic cylinder 49, mounted with bolts 50 onto surface 51 of feeder plate 2. Piston 52 of hydraulic cylinder 49 has a threaded engagement 53 with an activating T-coupling 54. Activating T-coupling 54 has a flanged end 55, slid into a slot 56 of an activating block 57. Extension and retraction movements of piston 52 of hydraulic cylinder 49 are transmitted to activating block 57 through the flat-surface contact between flanged end 55 of activating T-coupling 54 and slot 56 of activating block 57. At the opposite end, activating block 57 has an extension 58 in the shape of a peg, which rides in slot 59 of a guide 60. Guide 60 is secured to primary sprue bar extension 18 with bolts 61 and located with tubular dowels 62. Heat transfer from heated primary sprue bar extension 18 to unheated guide 60 is minimized by the use of an insulating plate 63 between these two components. Contact between extension 58 of activating block 57 and slot 59 of guide 60 helps guide the extend/retract movement of the activating block 57, as initiated by hydraulic cylinder 49.

The side of activating block 57 facing the primary sprue bar extension 18 has a slot 64. An activating lever 65, which can pivot about the axis of a dowel pin 66 secured in the body of primary sprue bar extension 18, passes through pocket 67 of primary sprue bar extension 18. End 68 of activating lever 65 is loosely situated in slot 64 of activating block 57, being held there by a dowel pin 69 that slides in an oval slot 70 of the activating block 57. Opposite end 71 of activating lever 65 is located in a matching slot 72 in the back end portion of primary sprue valve 21.

Activating block 57 has a forked extension 73 located in the space formed between the hydraulic cylinder 49 and primary sprue bar 16. Forked extension 73 has an oval slot 74 in which a dowel pin 75 can move. Dowel pin 75 is installed in loose engagement in end 76 of a compression lever 77. Compression lever 77, which can pivot about the axis of a dowel pin 78 secured in body of primary sprue bar 16, passes through pocket 79 of primary sprue bar 16.

Figure 9:
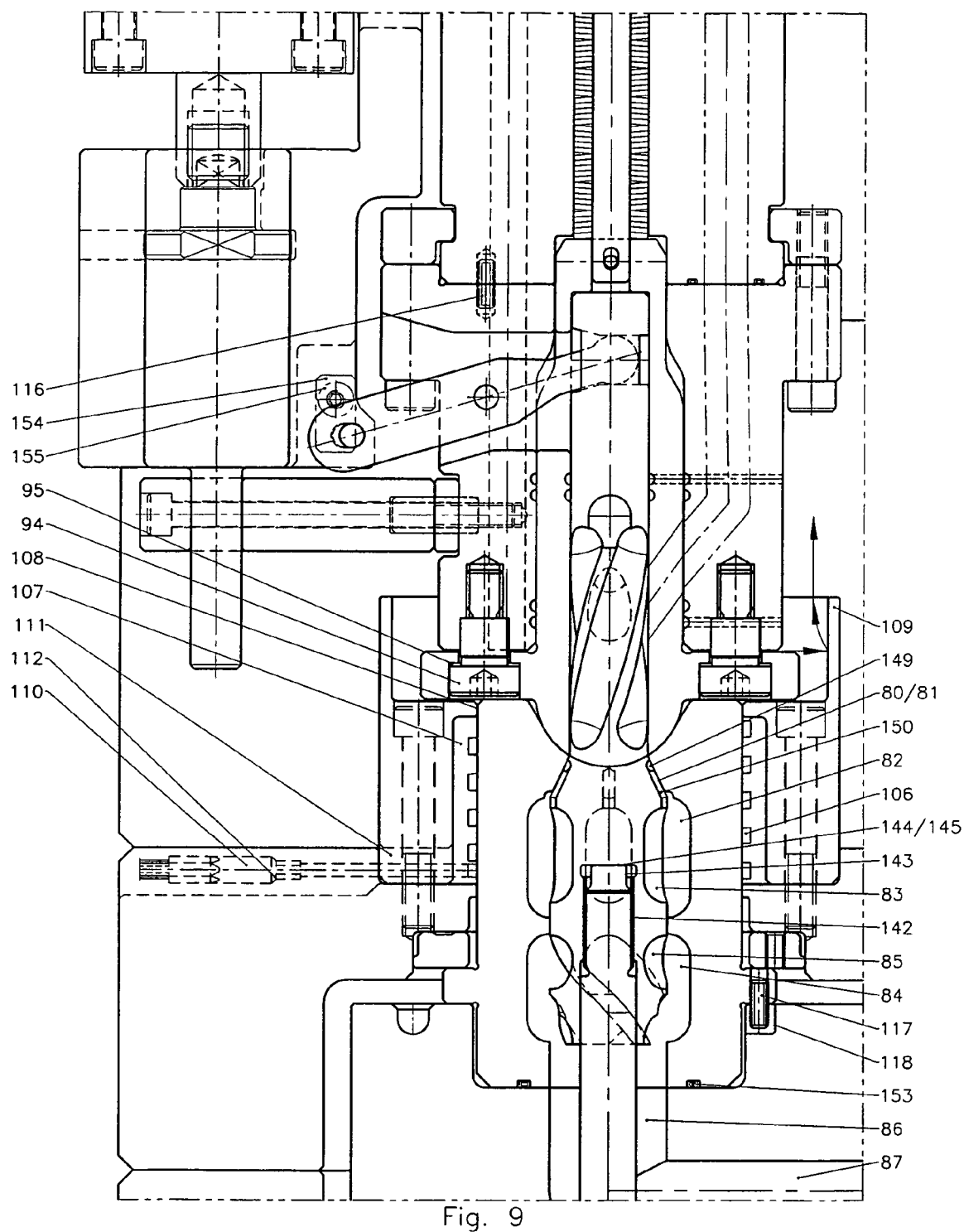
FIG. 9 is a cross-section detail of the central portion of the crossover nozzle system of FIG. 5.

When activating block 57 retracts, movement is transferred to both activating lever 65 and compression lever 77, causing them to pivot about dowel pins 66 and 78 respectively (see FIGS. 6 and 8 and open sprue valves as explained below):

With reference to FIGS. 8 and 9, end 71 of activating lever 65 pushes primary sprue valve 21 forward, which causes secondary sprue valve 38 to move back, while staying always in contact with primary sprue valve 21, through spherical surface 48, as activated by piston 42 of pneumatic cylinder 43. As secondary sprue valve 38 moves back, away from inner cone 80 of secondary sprue 27, molten plastic from spiral grooves 20 of primary sprue valve 21 is allowed to travel in the space formed between outer cone 81 of secondary sprue valve 38 and inner cone 80 of secondary sprue 27, and into linear grooves 82 of secondary sprue 27. Molten plastic then moves from grooves 82 of secondary sprue 27 plastic moves into linear grooves 83 of secondary sprue valve 38 and then into linear grooves 84 of secondary sprue 27. From there, plastic is transferred into spiral grooves 85 of secondary sprue valve 38, where it starts swirling and moves into the main manifold inlet 86. Flow line 87 of main manifold 15 distributes molten plastic to injection points. The reason plastic is passed through this succession of grooves is to create a pressure reducing position when secondary sprue valve 38 is closed. As secondary sprue valve 38 closes, its cylindrical portion located between grooves 83 and 85 comes in contact with cylindrical portion located between grooves 82 and 84 of the secondary sprue 27. The seal-off contact separates the high-pressure molten plastic of holes 86 and 87 from the low-pressure zone of grooves 82 and 83, thus protecting cones 80 and 81 from the high pressures existent in the flow channels of the mold.

End 88 of compression lever 77 pushes spring washer compression pin 89 forward. Spring washer compression pin 89 is installed in a central hole 90 in primary sprue bar 16, and can move forward by compressing spring washers 91, installed in series and in parallel in same hole 90. Spring washers 91 transfer the compression force to the back of floating sprue 19, to ensure contact of floating sprue 19 with secondary sprue 27 on spherical surface 34. Note: When end 88 of compression lever 77 releases contact with spring washer compression pin 89, spring-back of compression pin 89 is controlled by dowel pin 92 secured in back end of floating sprue 19. This dowel pin passes through on oval slot 93 in the front end of compression pin 89. Play of dowel pin 92 in slot 93 limits the stroke of compression pin 89.

Floating sprue 19 is loosely secured to primary sprue bar extension 18 with a number of shoulder bolts 94. There is a small clearance between bottom of holes 95 in floating sprue 19 and heads of shoulder bolts 94, so that heads of shoulder bolts 94 do not come in contact at the back with bottom of holes 95. This is a safety feature allowing some "floating provision" for floating sprue 19, working together with compression provided by spring washers 91 as activated by end 88 of compression lever 77 and compression pin 89. This floating provision is designed to compensate for manufacturing tolerances and heat expansions of the system's components.

Collector grooves and escape holes are provided in primary sprue bar extension 18 and floating sprue 19 for any leaks that might happen as molten plastic is transferred to primary sprue valve 21. Collector grooves 96 are provided on the inside of primary sprue bar extension 18, on both sides of inlets 97. Plastic collected by grooves 96 can be released through escape holes 98 connecting grooves 96 to outer wall of primary sprue bar extension 18. Collector grooves 99 are provided on one side of inlets 100 only, to seal back end of floating sprue 19. A similar escape hole 101 is provided through wall of floating sprue 19, connecting it to escape hole 98 of primary sprue bar extension 18.

On the primary side of the crossover nozzle system 13, long cartridge heaters 102 pass through holes in primary sprue bar 16 and primary sprue bar extension 18, to hold desired temperature of molten plastic as it travels through the crossover nozzle 13. Wires 103 from cartridge heaters 102 pass through holes 104 in feeder manifold 14 and through grooves 105 in top plate 1. Similarly, on secondary side, a coil heater 106 is installed around end 32 of secondary sprue 27, to keep the plastic at required melt temperature until it reaches the main manifold 15. A pocket 107 is provided inside secondary sprue locating ring 35 to house coil heater 106. Next to pocket 107, secondary sprue locating ring 35 has a small portion 108 in contact with end 32 of secondary sprue 27, for centering purpose. This is followed by a tubular shield 109, designed to direct the hot plastic towards the primary side, and prevent it from squirting towards the mold operator in case of accidental sealing failure of the crossover nozzle system 13. Wire 110 extends from coil heater 106, through a slot 111 at back of secondary sprue locating ring 35, into groove 112 on surface 33 of stationary manifold plate 6.

It is evident that components of the crossover nozzle 13 are precisely oriented radially, relative to one another, so that molten plastic can travel through the system without blockages. Dowel pin 113 locates primary sprue bar 16 radially in reference to feeder plate 2. Dowel pin 113 passes through primary pressure ring 24, having one end press-fit in a hole 114 in pocket 23 of feeder plate 2, while opposite end is housed in an open slot 115 in flange 22 of primary sprue bar 16. Dowel pin 116 orients primary sprue bar extension 18 relative to primary sprue bar 16. Shoulder bolts 94 orient floating sprue 19 relative to primary sprue bar extension 18. Slot 72 of primary sprue valve 21, holding end 71 of activating lever 65, orients primary sprue valve 21 relative to floating sprue 19. On opposite side, secondary sprue 27 is oriented radially, relative to main manifold 15, by dowel pin 117. One end of dowel pin 117 is press-fit into a matching hole in annular flange 29 of secondary sprue 27, while opposite end is housed in an open slot 118 in main manifold 15. Radial orientation of all these parts ensures that inlets 97 of primary sprue bar extension 18 communicate directly with inlets 100 of floating sprue 19, and that inlets 100 open into grooves 119 of primary sprue valve 21, which direct plastic to spiral grooves 20. Plastic is then pushed, swirling, further into grooves 82 of secondary sprue 27. Radial orientation explained before matches linear grooves 82 of secondary sprue 27 with linear grooves 83 of secondary sprue valve 38, and also end of linear grooves 84 of secondary sprue 27 with beginning of spiral grooves 85 of secondary sprue valve 38, so that plastic can flow through these channels without any restrictions.

Figure 10:
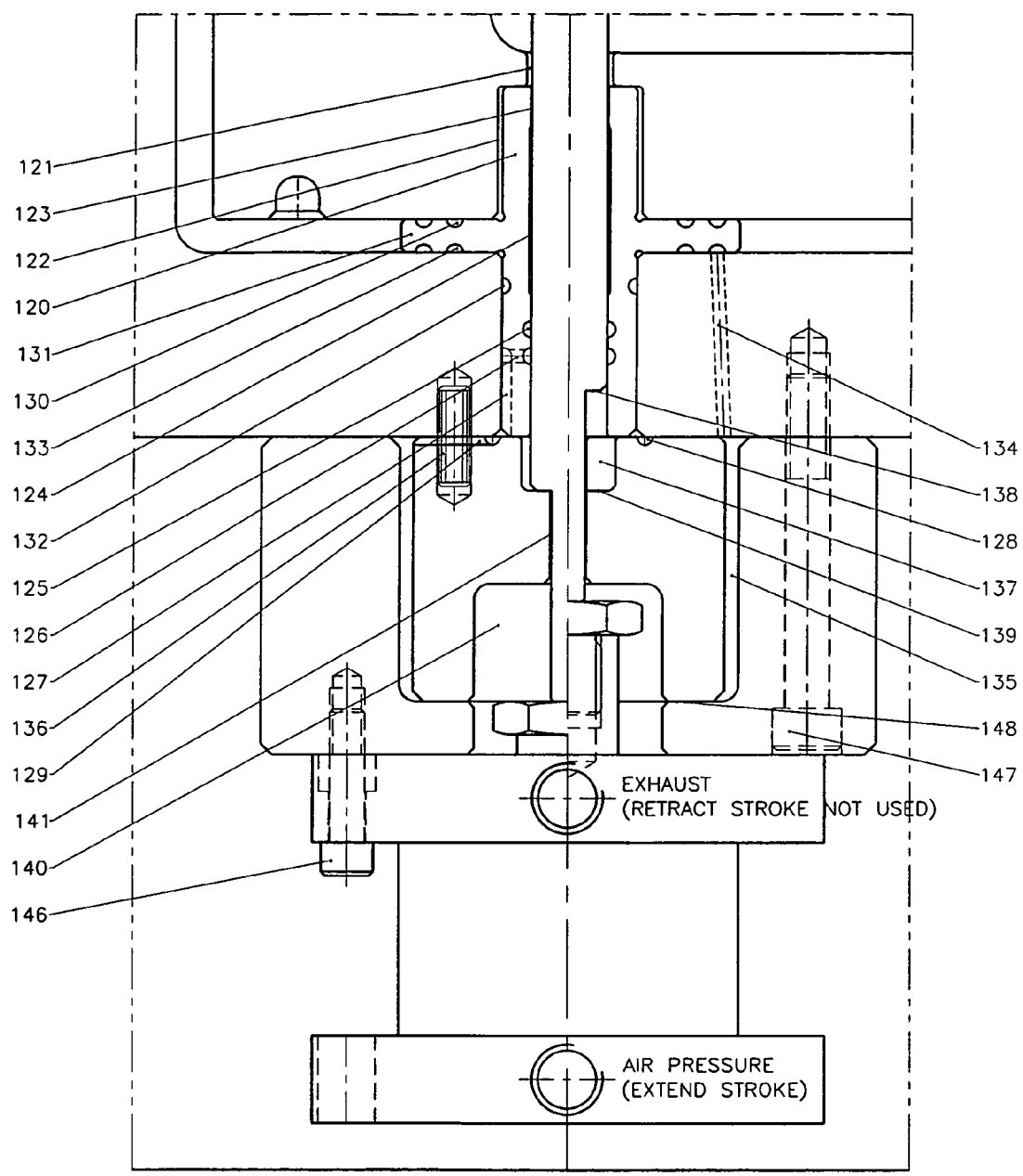
FIG. 10 is a cross-section detail of the bottom portion (secondary side) of the crossover nozzle system of FIG. 5.
Figure 11:
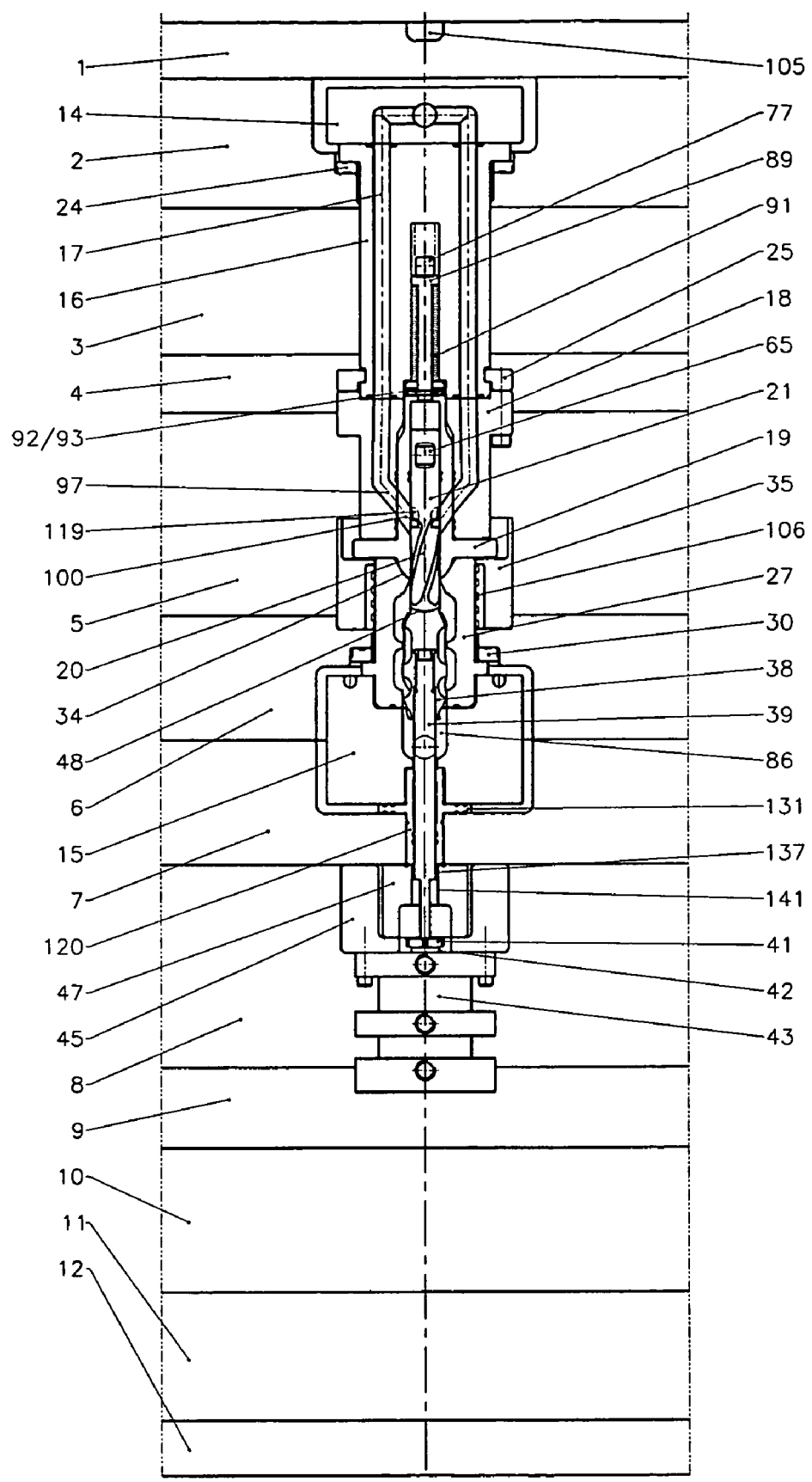
FIG. 11 is a partial cross-section through the centerline of the crossover nozzle system of FIG. 5, along a direction orthogonal to the one shown in FIGS. 5 through 10, shown with sprue valve open and mold closed.
Figure 12:
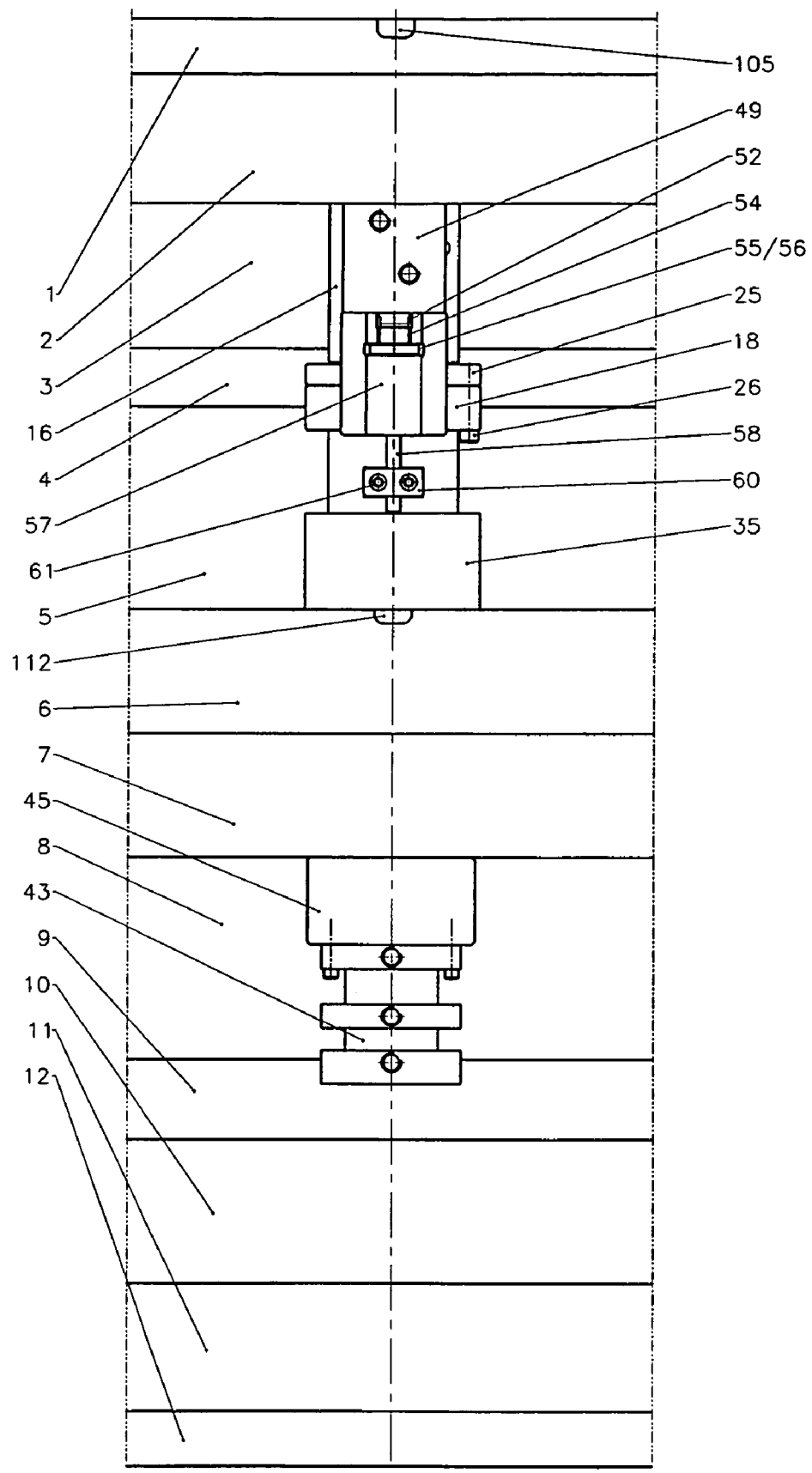
FIG. 12 is a side view of the crossover nozzle of FIG. 5, shown with mold closed.
Figure 13:
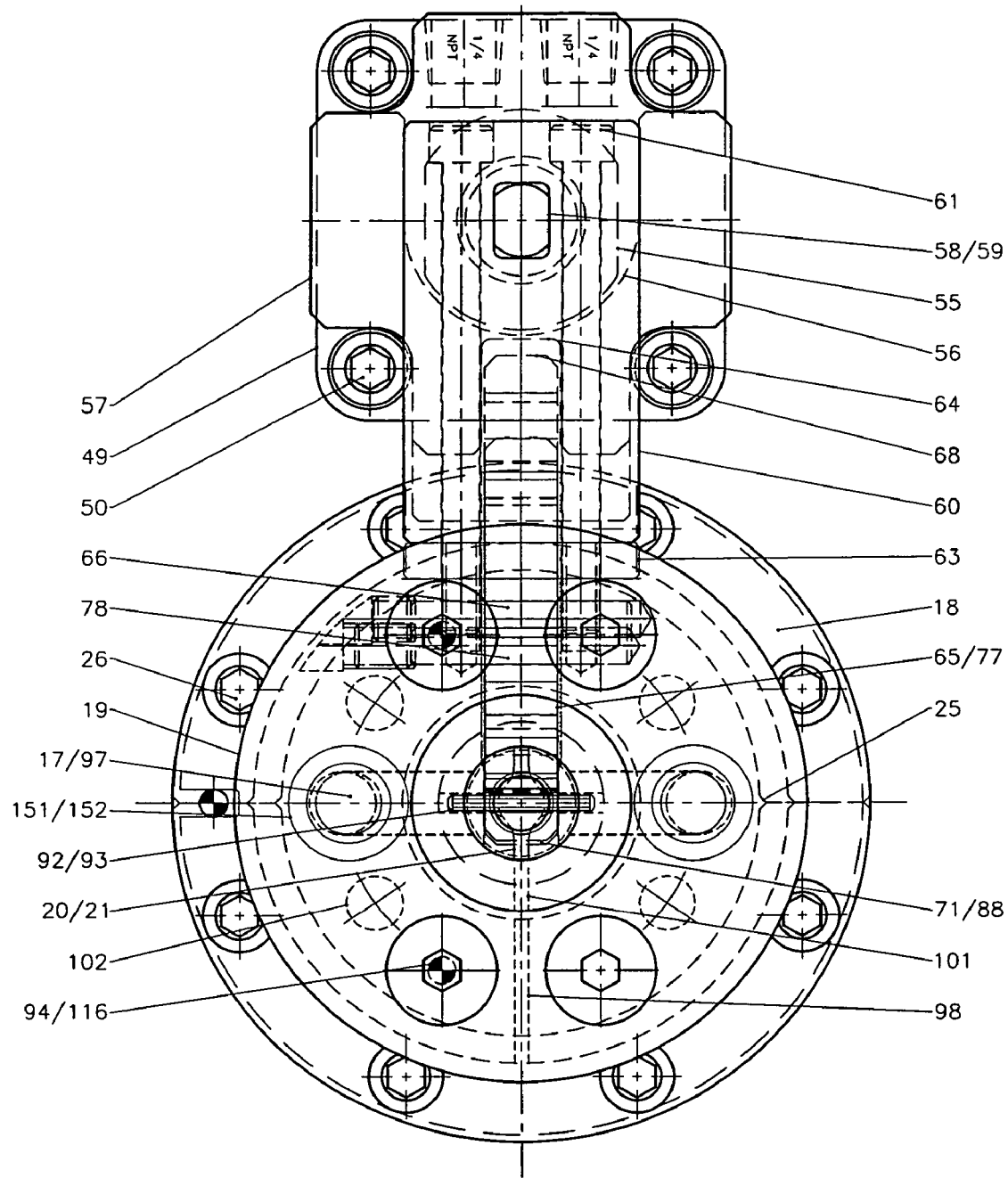
FIG. 13 is a detailed plan view of the primary side of the crossover nozzle system of FIG. 5.
Figure 14:
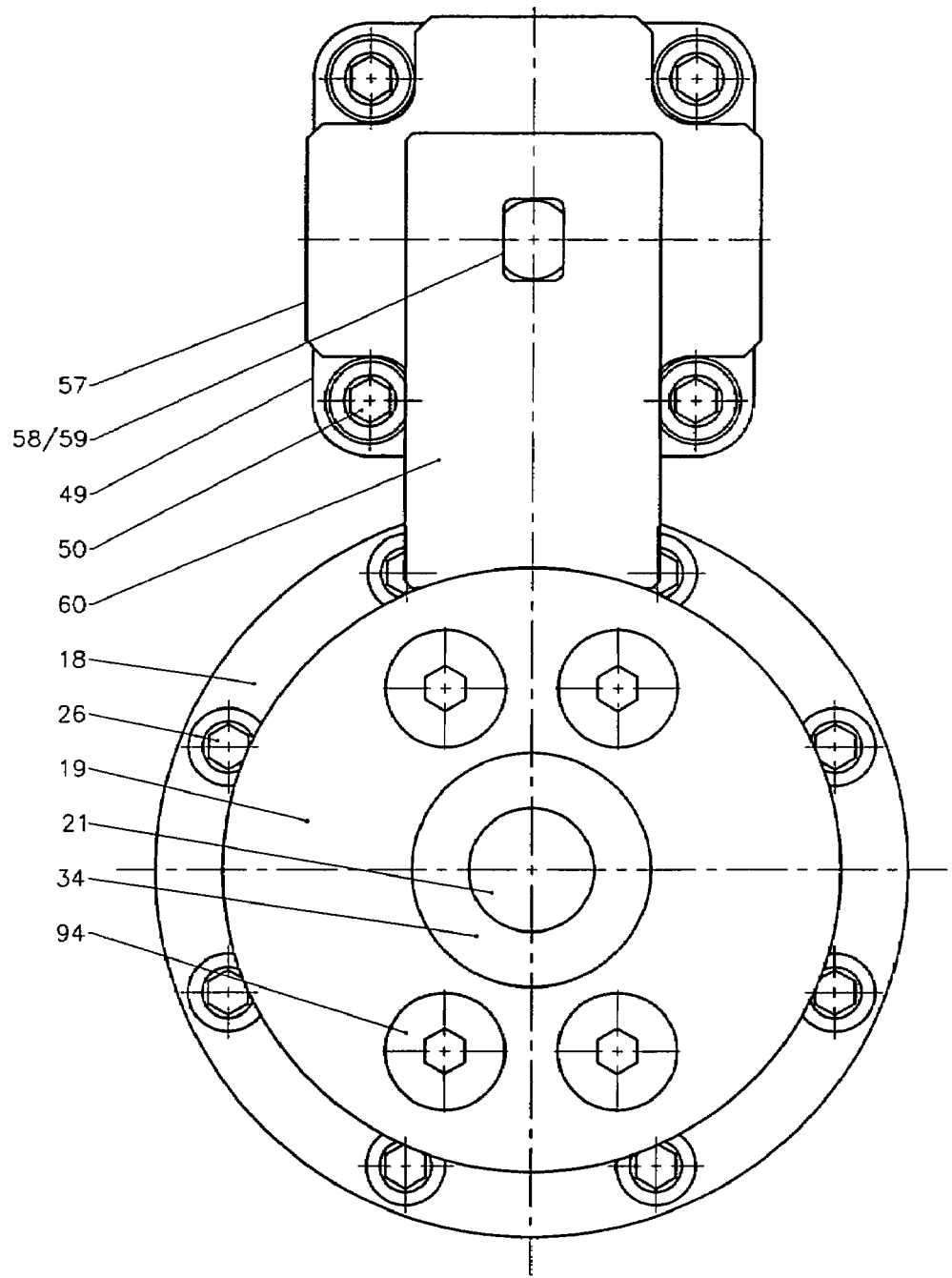
FIG. 14 is a simplified plan view of the primary side of the crossover nozzle system of FIG. 5.
Figure 15:
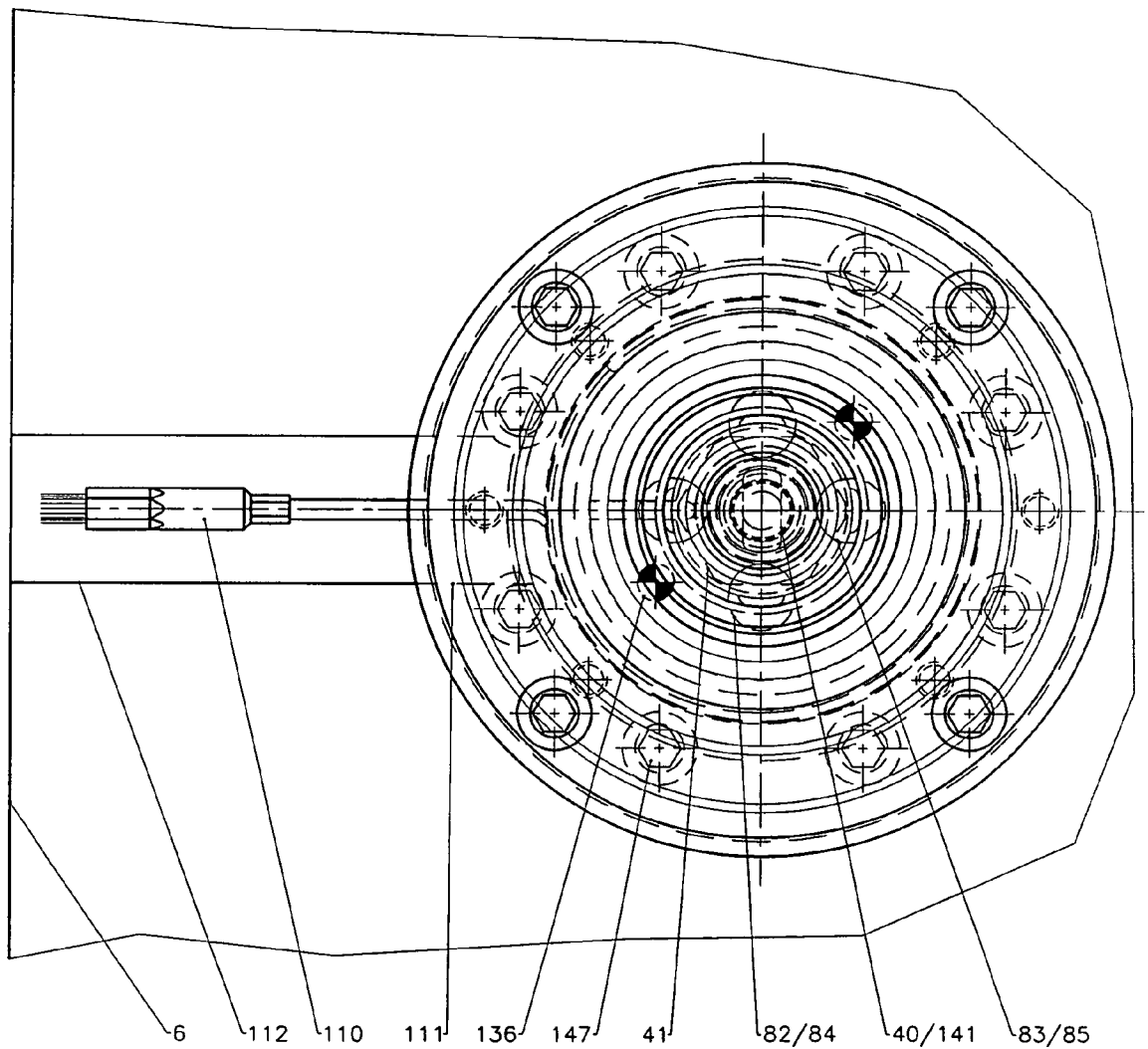
FIG. 15 is a detailed plan view of the secondary side of the crossover nozzle system of FIG. 5.
Figure 16:
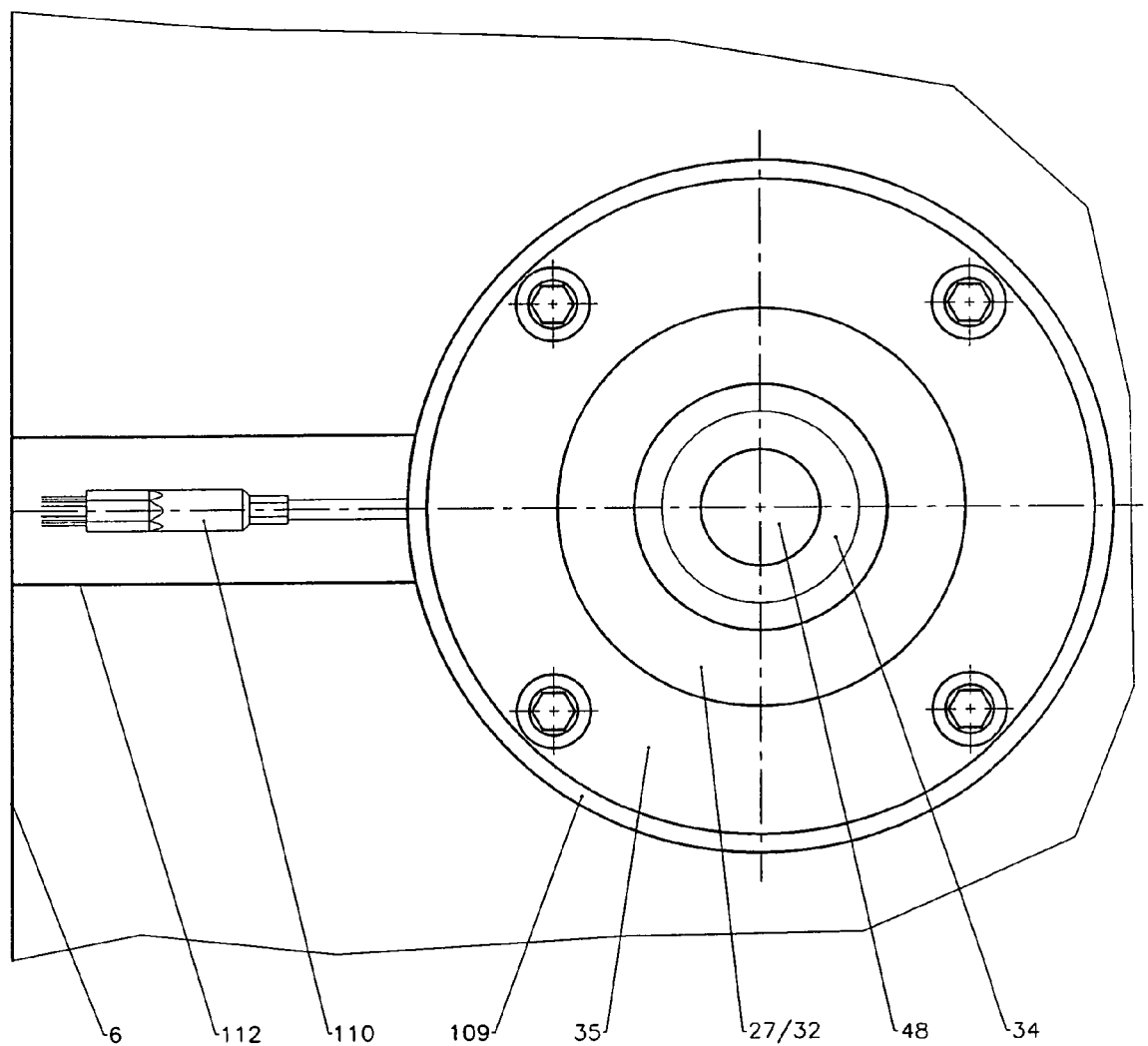
FIG. 16 is a simplified plan view of the secondary side of the crossover nozzle system of FIG. 5.

With reference to FIG. 10, at opposite end of crossover nozzle system 13, a manifold sealing sleeve 120 is installed between main manifold 15 and moving manifold plate 7. The purpose of this sleeve is to seal the back end of the crossover nozzle 13 from any plastic leakage from the main manifold 7. With reference to FIG. 9 and 10, plastic from main manifold inlet 86 can leak through hole 121 in hole 122 around top end of manifold sealing sleeve 120, and also through the thermo-barrier access gap 123 inside manifold sealing sleeve 120, in groove 124 where it can form a thermo-barrier. Any leaks from the thermo-barrier can be caught by a pair of collector grooves 125, and transferred, through radial escape hole 126 and axial groove 127 of the manifold sealing sleeve 120, to annular groove 128 and radial escape groove 129 of extension rod stop 47. Any plastic leaks from hole 122 can be caught by a pair of annular collector grooves 130 provided on the side of flange portion 131 of manifold sealing sleeve 120 that faces the main manifold 15. Any plastic leaks from radial escape hole 126, that are not directed by axial groove 127 out of the moving manifold plate 7, can be caught by annular groove 132 of manifold sealing sleeve 120, located below flange portion 131. A pair of annular grooves 133 is provided on flange portion 131 of manifold sealing sleeve 120, opposite grooves 130, communicating, through escape hole 134, to back of moving manifold plate 7. Plastic leaks from escape hole 134 and also from radial groove 129 are therefore directed in the space 135 formed in pocket 46, between extension rod stop 47 and cylinder support 45.

Secondary sprue valve extension rod 39 is provided with two flat surfaces 40 on end that is connected to pneumatic cylinder 43. Extension rod stop 47 is held onto back of moving manifold plate 7 by cylinder support 45, and is oriented relative to moving manifold plate 7 by dowel pin 136. Extension rod stop 47 has a round pocket 137 housing the end of the cylindrical portion of secondary sprue valve extension rod 39. Flat surfaces 138 of extension rod 39 come in contact with bottom 139 of pocket 137 when primary sprue valve 21 and secondary sprue valve 38 are opened. Bottom 139 of pocket 137 thus acts as a stroke limiter for the two sprue valves. Opposite end of extension rod stop 47 has another round pocket 140, designed with clearance, for piston 42 of pneumatic cylinder 43, and for T-coupling 41 connected to piston 42. An oval slot 141 extends from pocket 137 to pocket 140 inside extension rod stop 47, guiding flat surfaces 40 of extension rod 39. With reference to FIG. 9, at opposite end, extension rod 39 has a threaded portion 142 and a cylindrical surface 143, ending with a flat surface 144. Extension rod 39 is threaded inside secondary sprue valve 38, and torqued until its flat end 144 presses against flat bottom 145 of hole in secondary sprue valve 38. Correct radial orientation of secondary sprue valve 38 relative to secondary sprue 27 is therefore achieved through dowel pin 136, flat surfaces 40 in slot 141 and contact between surface 144 and surface 145. It is this succession of radial orientations that locates grooves 83 and 85 of secondary sprue valve 38 directly in line with grooves 82 and 84 of secondary sprue 27.

Pneumatic cylinder 43 is secured to cylinder support 45 with bolts 146. Cylinder support is secured onto surface 44 of moving manifold plate 7 with bolts 147. Bottom surface 148 of pocket 46 presses onto back face of extension rod stop 47 for support.

Extension rod 39 and T-coupling 41 are in contact, but not rigidly connected together. When primary sprue valve 21 pushes secondary sprue valve 38 and extension rod 39 back, piston 42 is pushed further inside pneumatic cylinder 43, until surface 138 of extension rod 39 comes in contact with bottom 139 of pocket 137 of extension rod stop 47. Piston 42 of pneumatic cylinder 43 is constantly activated forward, to keep secondary sprue valve 38 in permanent contact with primary sprue valve 21. No retraction is necessary on the pneumatic cylinder; its "retract" inlet is used simply as an exhaust (FIG. 10). This means that pneumatic cylinder 43 actuates extension rod 39 and secondary sprue valve 38 only on the extend stroke of piston 42, until outer cone 81 of secondary sprue valve 38 is fully in contact with inner cone 80 of secondary sprue 27. The force of the hydraulic cylinder 49 being stronger than that of the pneumatic cylinder 43, it causes the succession of components previously described to push piston 42 further back in the pneumatic cylinder 43 when activating the sprue valves to open. When action of the hydraulic cylinder 49 is reversed, pneumatic cylinder 43 is relieved of this external force, and its own air pressure can extend piston 42 back out again. Note: Pneumatic cylinder 43 is not used at its maximum stroke. Less stroke is used, so that there is always an additional amount of stroke available for small adjustments that might become necessary. For example, after extended use of the crossover nozzle system 13, inner cone 80 of secondary sprue 27 or outer cone 81 of secondary sprue valve 38 might become slightly worn. Compensation of wear is then achieved by using additional stroke on the pneumatic cylinder 43. Such adjustment happens automatically, as piston 42 of pneumatic cylinder 43 always tries to extend for the full stroke, but will of course stop when inner cone 80 of secondary sprue 27 prevents outer cone 81 of secondary sprue valve 38 from going any further.

With reference to FIG. 9, secondary sprue valve 38 has a small annular groove 149 on outer cone 81, near spherical surface 48. From this, a number of small linear grooves 150 are provided on outer cone 81 of secondary sprue valve 38, extending to grooves 83. Grooves 149 and 150 are designed to allow plastic caught between conical surfaces 80 and 81 to escape to grooves 83 when sprue valve closes.

The crossover nozzle system 13 is synchronized with the mold cycles by use of two signals only. These are "open" and "close" on hydraulic cylinder 49. They cause an extend/retract stroke S1 on piston 52 of hydraulic cylinder 49, and a transferred motion/stroke S2 (equivalent to a "retract" stroke on piston 42 of pneumatic cylinder 43. The extend stroke of piston 42 is achieved by its own air pressure, which is constantly on, therefore not requiring an additional synchronizing control. An advantage of this design is that the injection machine can operate the crossover nozzle system 13 with only one valve control. Also, precise timing between the two cylinders is not necessary, since cylinder 43 is always pushing forward, piggybacking on the signal of the hydraulic cylinder 49. Another advantage, due to the piggyback effect, is that plastic has less chance to seep between primary sprue valve 21 and secondary sprue valve 38 at spherical surface 48.

Metal o-rings are used throughout the crossover nozzle system wherever necessary, as they can withstand high pressures and high temperatures. With reference to FIGS. 8 and 9, metal o-rings 151 are used to seal between primary sprue bar 16 and feeder manifold 14. Metal o-rings 152 are used to seal between primary sprue bar 16 and primary sprue bar extension 18. A metal o-ring 153 is also used to seal between back of secondary sprue 27 and pocket 28 of main manifold 15.

Dowel pins 69 and 75 are prevented from falling out of their respective oval slots 70 and 74 by cover plates 154 secured to the side of activating block 57 with button head cap screws 155.

Figure 17:
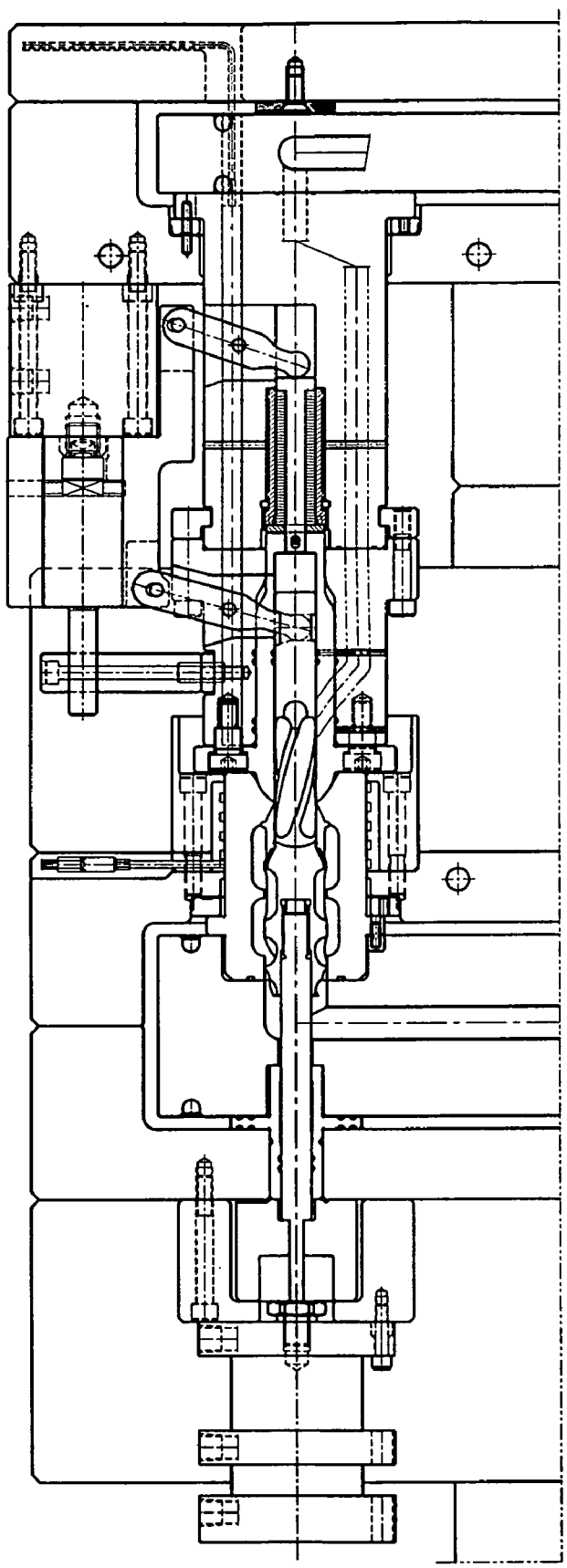
FIG. 17 is a partial cross-section view through the centerline of a first alternate embodiment of the crossover nozzle system, shown with sprue valve open and mold closed.
Figure 18:
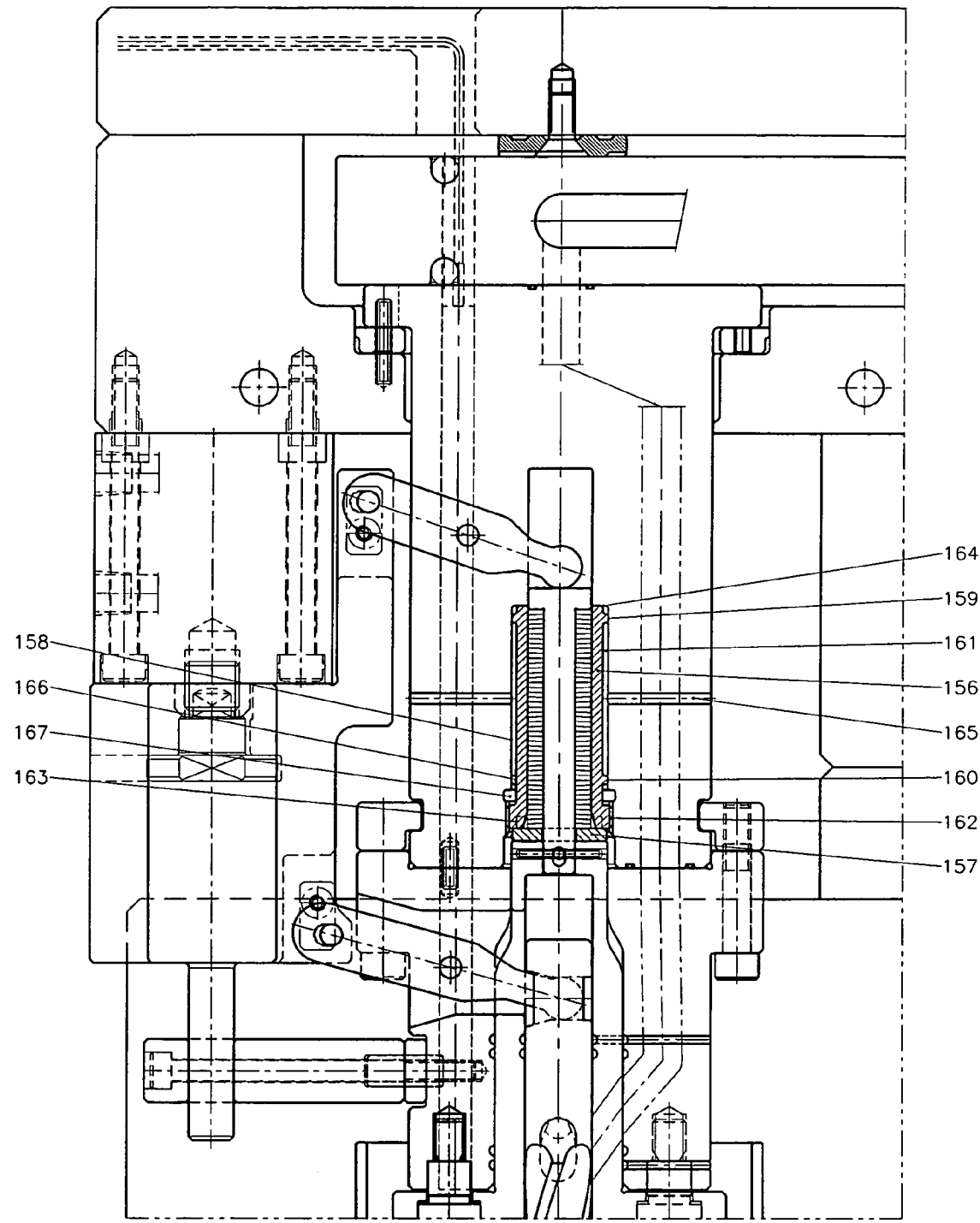
FIG. 18 is a cross-section detail of the central portion of the alternate embodiment shown in FIG. 17.
Figure 19:
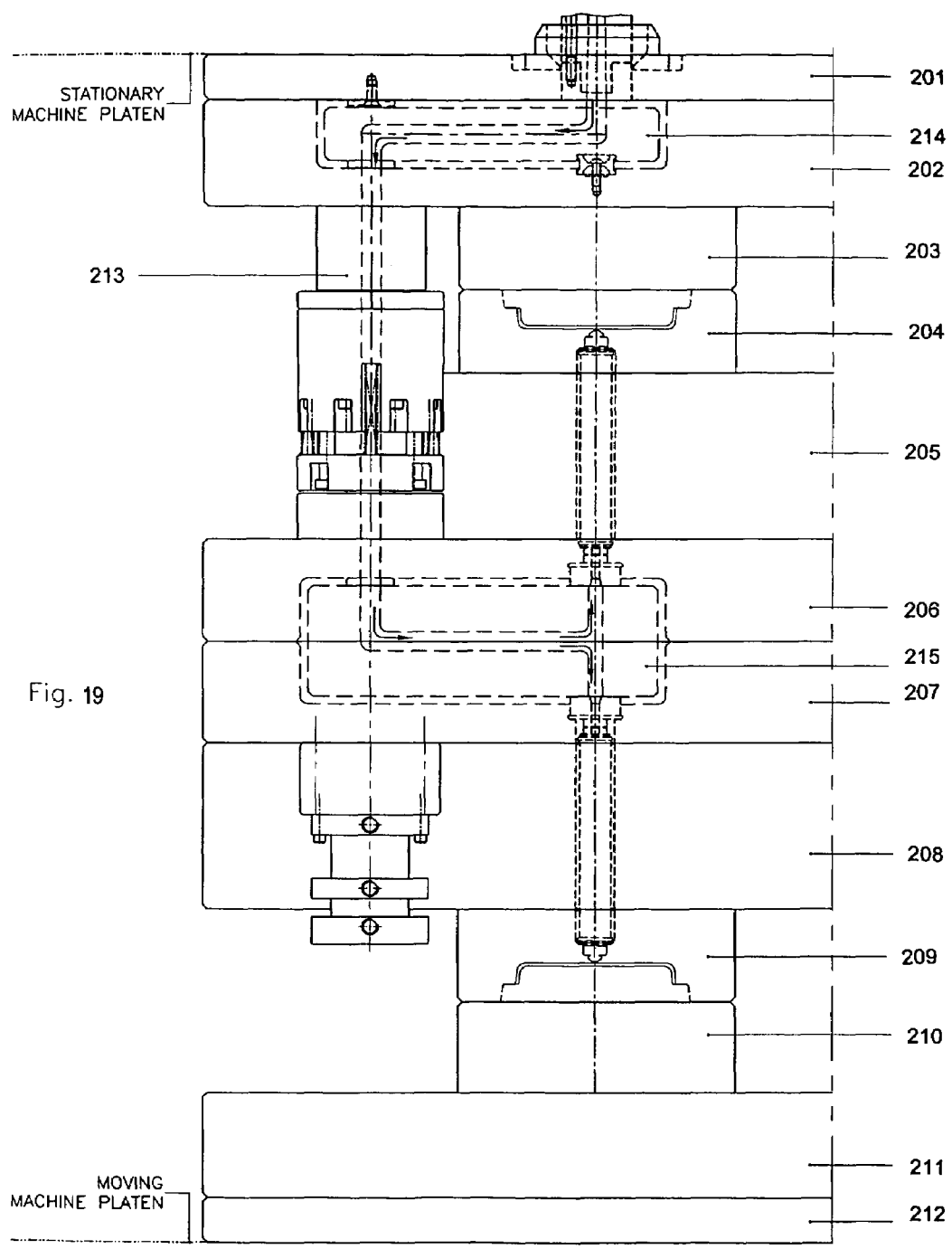
FIG. 19 is a partial view of a second alternative embodiment of the crossover nozzle system, shown with mold closed.

An alternate embodiment is presented in FIG. 17, and is shown in more detail in FIG. 18. It uses an insulating sleeve 156 and insulating washer 157 inserted into a central hole 158 in primary sprue bar 16, at the interface with primary sprue bar extension 18. Insulating sleeve 156 has two centering portions, 159 and 160, separated by a long relief 161. Insulating sleeve 156 is in threaded engagement 162 with body of primary sprue bar 16, and has an oval slot 163 on its front surface for torquing purpose. Insulating sleeve 156 is be torqued until its back surface comes in firm contact with bottom 164 of central hole 158 of primary sprue bar 16. Insulating washer 157 is centered on the spring washer compression pin 89, between insulating sleeve 156 and back end of floating sprue 19. The insulating sleeve 156 and insulating washer 157 are made of a material with low thermal conductivity, and they are employed to protect spring washers 91 from the high heat of the primary sprue bar 16 and floating sprue 19. Radial holes 165 allow air access to relief 161, providing air insulation all around insulating sleeve 156. A number of flat portions 166 are provided on centering portion 160, to allow air circulation from relief 161 into space 167 formed between centering portion 160 and threaded engagement 162. This measure increases length of air-cooled zone, protecting both spring washers 91 and spring washer compression pin 89 from the system's high heat.

A second alternate embodiment is shown described below in conjunction with FIGS. 19-25. This alternate embodiment provides a system that transfers molten plastic from the inlet at the center of stationary platen of injection machine, through a feeder manifold and an off-center crossover nozzle, to the main manifold of the stack mold.

With reference to FIGS. 19 through 25, the mold comprises a top plate 201, feeder plate/stationary core plate 202, stationary core 203, stationary cavity 204, stationary cavity plate 205, stationary manifold plate 206, moving manifold plate 207, moving cavity plate 208, moving cavity 209, moving core 210, moving core plate 211, bottom plate 212 and crossover nozzle system 213. It should be understood that fewer or more mold plates or blocks may be employed depending on specific design requirements.

Stationary core 203 is secured to feeder plate 202, which is secured to top plate 201. Top plate 201 is bolted to stationary machine platen. Similarly, moving core 210 is secured to moving core plate 211, which is secured to bottom plate 212. Bottom plate 212 is bolted to moving machine platen. Stationary cavity 204 is secured to stationary cavity plate 205, which is secured to stationary manifold plate 206. Moving cavity 209 is secured to moving cavity plate 208, which is secured to moving manifold plate 207. Stationary manifold plate 206 and moving manifold plate 207 are secured together, and supported at the center of the injection machine. As such, the mold has three main portions: a core side attached to the stationary machine platen (this portion is completely stationary), another core side attached to the moving machine platen (this portion opens for a double stroke, once for each mold cycle), and a central portion containing the cavity sides (which rides on the machine tie bars or guide ways and opens for a full stroke, once for each mold cycle). At the end of each mold cycle, the mold opens equally on both sides to release the molded parts.

Figure 20:
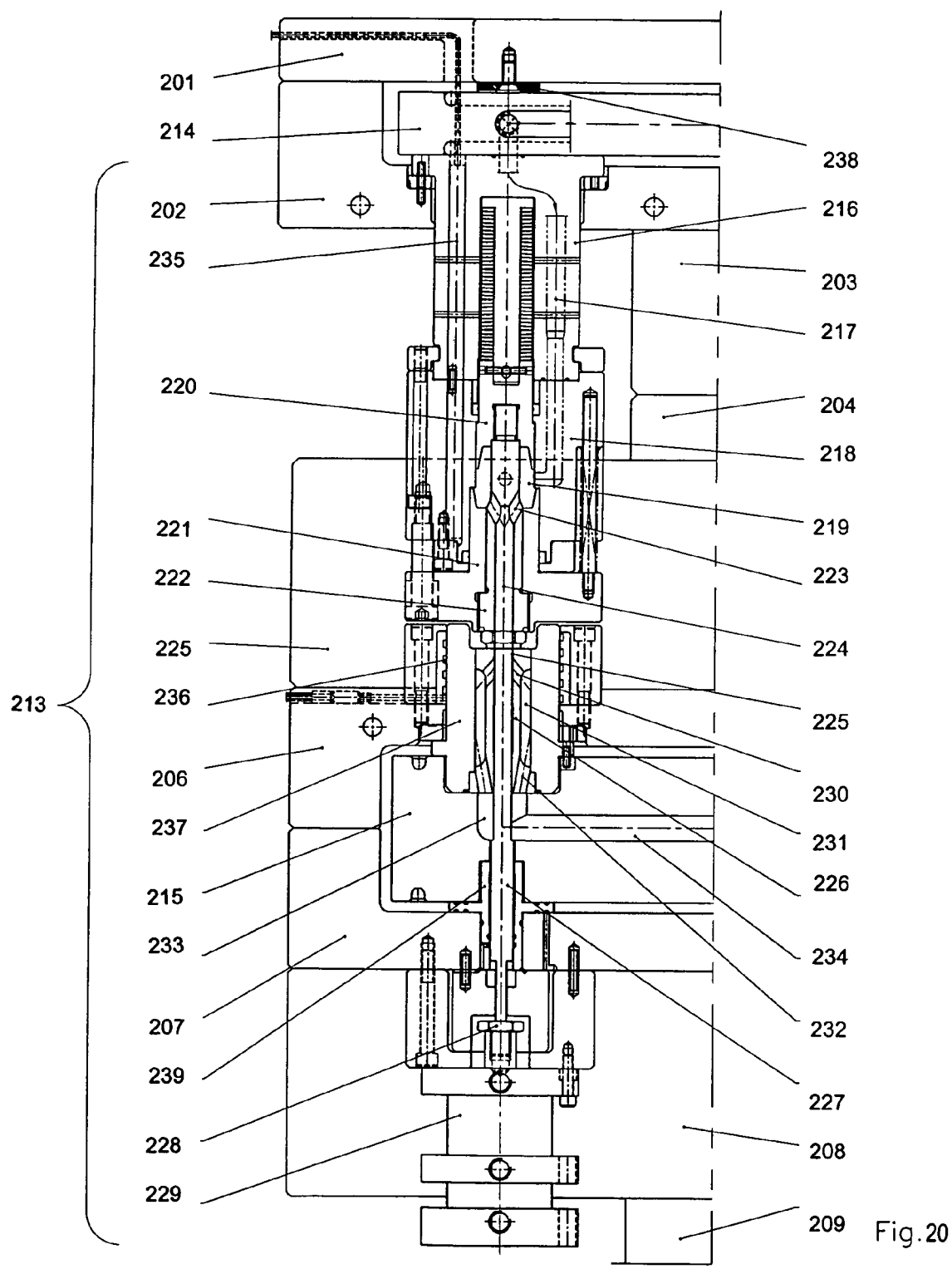
FIG. 20 is a section view of the crossover nozzle system of FIG. 19, shown with valve closed and mold closed.

With reference to FIG. 20, the crossover nozzle system 213 transfers molten plastic from feeder manifold 214 to main manifold 215 through a succession of components. From feeder manifold 214, plastic enters the primary sprue bar 216 through holes 217. It continues on, through primary sprue bar extension 218, into a transfer chamber 219 formed between a back floating sprue 220 and a front floating sprue 221. The two floating sprues are centered on and secured to a primary sprue shut-off valve 222. From transfer chamber 219, molten plastic travels through a number of radial holes 223 to a central hole 224 in the body of primary sprue shut-off valve 222. From here, plastic travels into central hole 225 of a secondary sprue shut-off insert 226, by pushing valve stem 227 back. Valve stem 227 is constantly activated forward, towards closing central hole 225, by a T-coupling 228, threadably secured to the piston of an activating cylinder 229 (e.g. pneumatic). When the mold is closed for a new cycle, the injection pressure of the molten plastic overcomes the forward pressure of the activating cylinder 229 and moves the valve stem 227 back. Molten plastic then gains access to central hole 225, and from there to a number of radial holes 230 extending to side grooves 231 of same secondary sprue shut-off insert 226. From side grooves 231, plastic is transferred, through radial holes 232, into the inlet hole 233 of the main manifold 215. Flow lines 234 of main manifold 215 allow transfer of molten plastic to all the molding chambers of the mold. As the mold cycle ends, injection pressure is stopped, which allows valve stem 227 to move forward as activated by cylinder 229, and seal the secondary side of the system. On the primary side, the floating assembly, formed by back floating sprue 220, front floating sprue 221 and primary sprue shut-off valve 222, moves away from primary sprue bar extension 218, in a manner that is described in more detail below. Forward motion of floating assembly causes decompression in transfer chamber 219, which results in a pullback of the molten plastic in central hole 224. This allows a drool-free opening of the crossover nozzle system, as the mold opens and molded parts are ejected.

Multiple heaters are used throughout the system in order to hold the required melt temperature of the flowing plastic. On the primary side, cartridge heaters 235 are used to heat up the primary sprue bar 216 and the primary sprue bar extension 218. On the secondary side, coil heater 236 is used around the secondary sprue 237 surrounding the secondary sprue shut-off insert 226. Further components will be described below as necessary.

The crossover nozzle system 213 is parallel to, and located at a fixed distance in reference to the mold centerline. As can be seen from FIG. 20, the main body of the crossover nozzle system 213 is stacked between feeder manifold 214 and main manifold 215. Behind the feeder manifold 214, in line with the crossover nozzle system 213, a pressure pad 238 transfers pressures from the system, through the top plate 201, to the machine platen (injection press). This is a safety measure designed to avoid deflection of the feeder manifold 214 as can be caused by the high pressures of the crossover nozzle system 213. On the opposite side, pressures from the system are transferred through main manifold 215 to flange of manifold sealing sleeve 239 and to moving manifold plate 207. While networks of waterlines cool the mold plates, the feeder manifold 214 and the main manifold 215 are heated and expand thermally. Components of the crossover nozzle system 213 are also heated and undergoing thermal expansion. The cumulation of all the individual thermal expansions along the length of the crossover nozzle system results in improved sealing between its components.

Aside from the slight thickness increase of the two manifolds, thermal expansion also causes an increase in length of the manifolds, the distance between centerline of mold and centerline of crossover nozzle being of special importance here. That is because this system crosses simultaneously through cooled mold plates, that have no meaningful thermal expansion, and through the heated main manifold 215, which expands significantly. A number of actions are taken to stabilize the crossover nozzle system 213 against the de-stabilizing influence of the expanding main manifold 215:

(a) A secondary sprue locating ring 240, centered in the stationary manifold plate 206, is employed to locate secondary sprue 273. Proper location/centering of secondary sprue 273 enables this component to be in contact simultaneously with the expanding main manifold 215 and the "static" secondary sprue shut-off insert 226 and valve stem 227. Any off-center deviation of the secondary sprue 237 would cause deflection of the valve stem 227, which could compromise the functioning of the entire crossover nozzle system.

(b) Pocket 241 in the main manifold 215, holding end of secondary sprue 237, is made with sufficient clearance to further prevent deviation of the secondary sprue 237 as would be caused by thermal expansion of the main manifold 215.

(c) Pocket 242 in main manifold 215, holding one end of manifold sealing sleeve 239 is also made with sufficient clearance, to prevent any deviation of the sealing sleeve 239, which could be transferred to valve stem 227.

By providing seal-offs and clearances as described, manifolds are allowed to expand or retract without putting stress onto components of the eccentric crossover nozzle system, all the while sealing on pairs of mating surfaces transversal to centerline of crossover nozzle system.

On the primary side, the cooled feeder plate 222 centers the primary sprue bar 216, which has only planar contact with the expanding feeder manifold 214.

Figure 21:
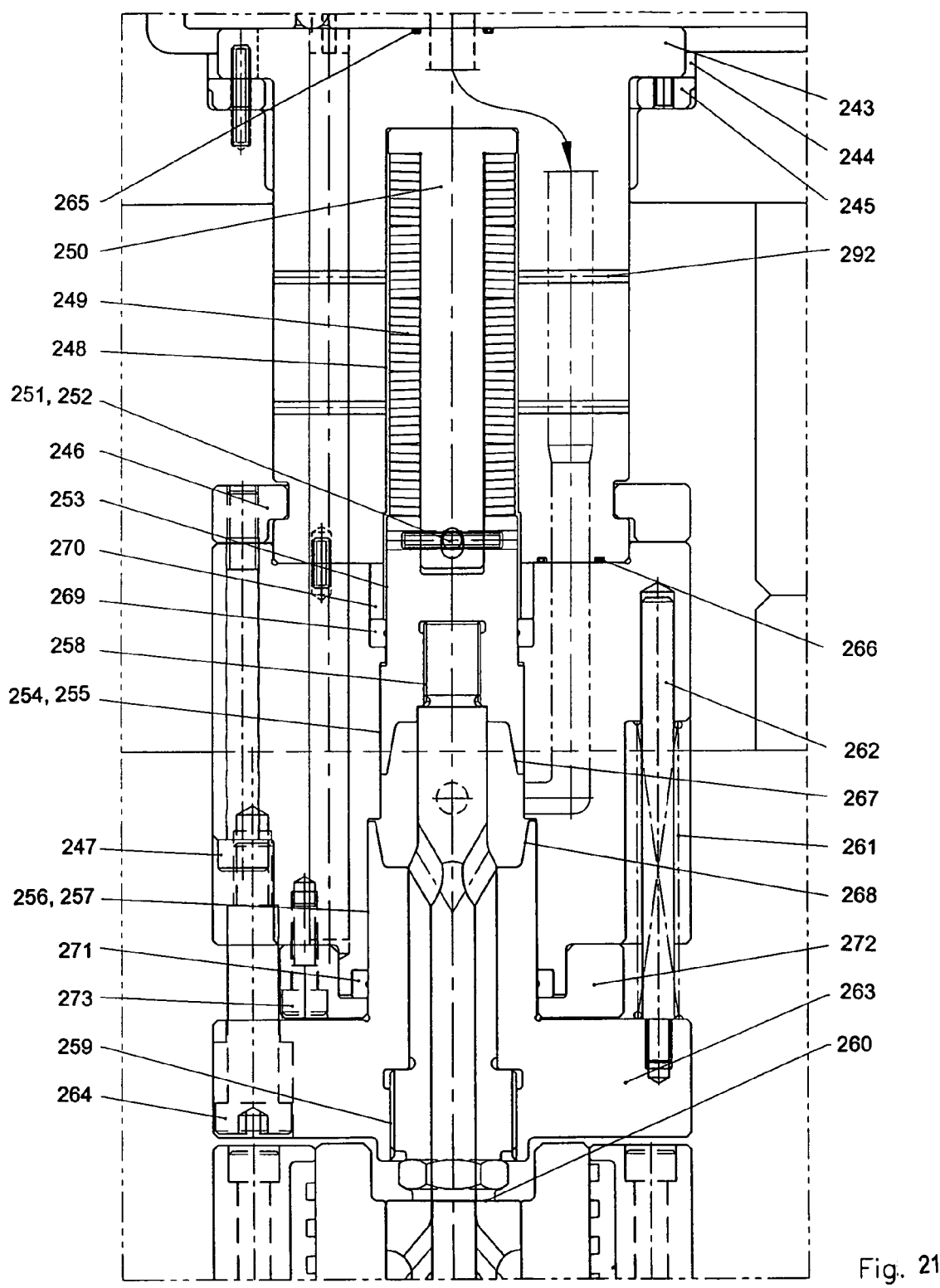
FIG. 21 is an enlarged detail of the primary side of embodiment of FIG. 20.
Figure 22:
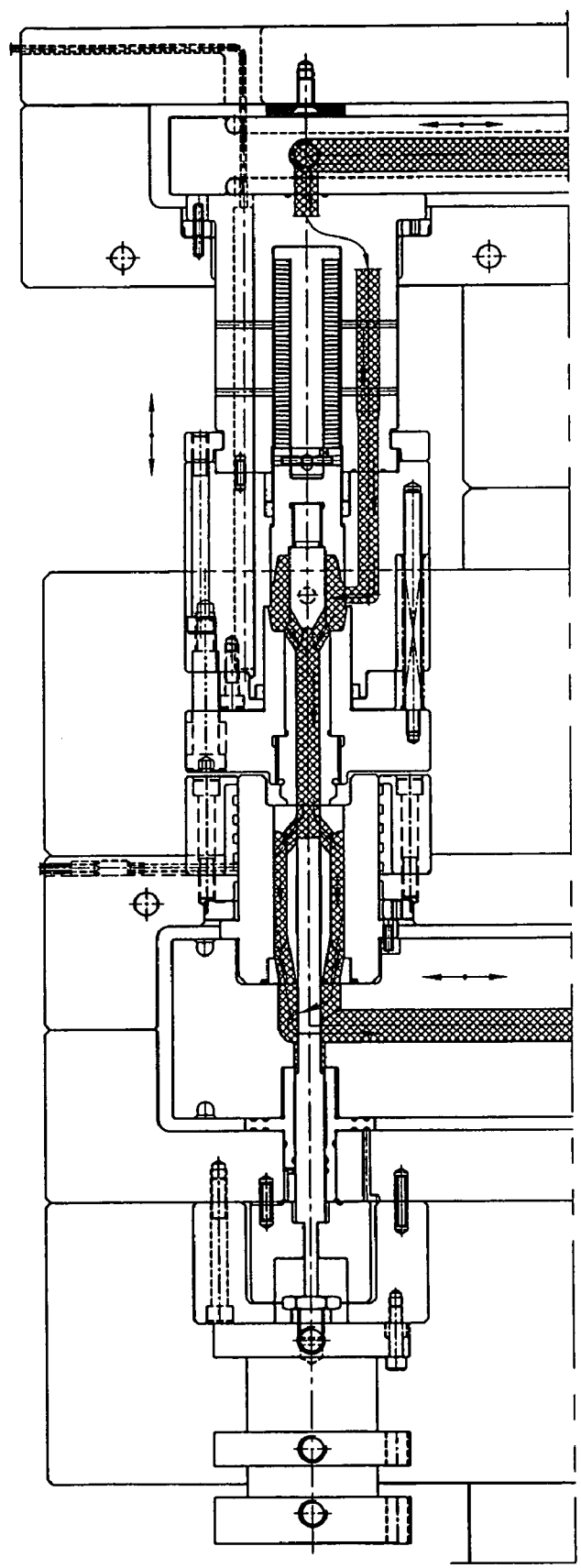
FIG. 22 is a section view of the embodiment of FIG. 20, shown with valve open and mold closed.
Figure 23:
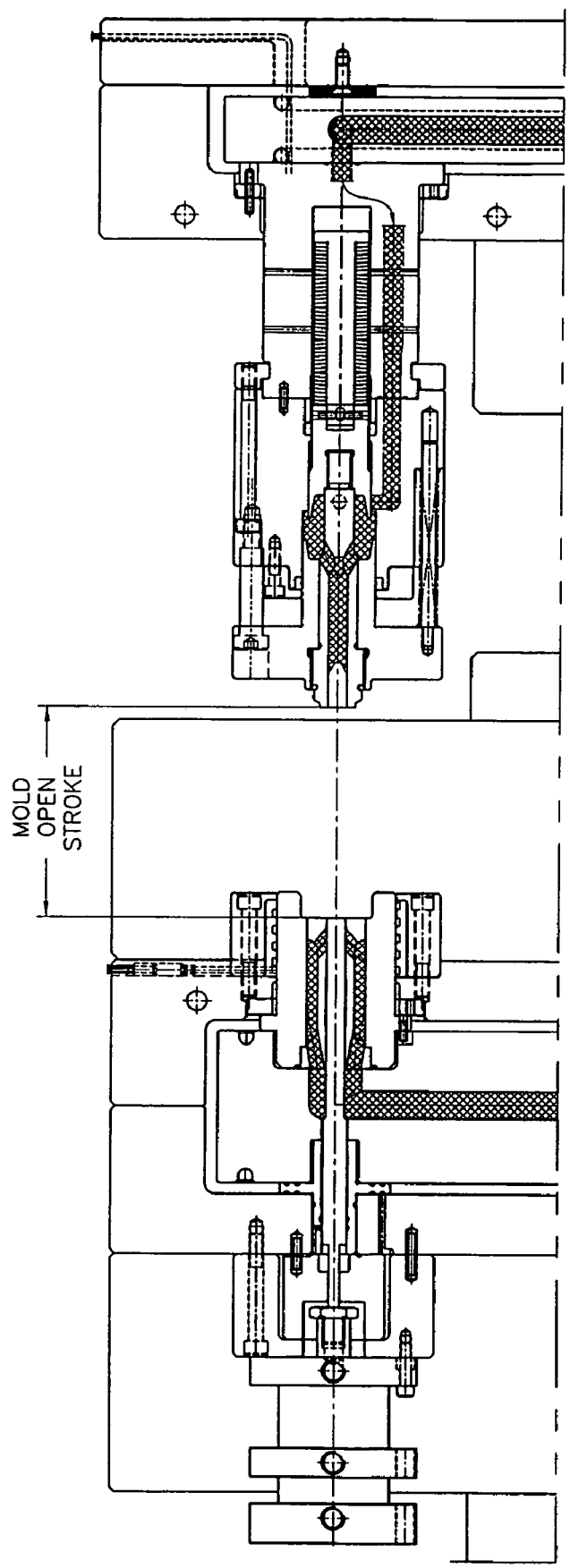
FIG. 23 is a section view of the embodiment of FIG. 19, shown with mold open for ejection of molded parts. Valve is closed on secondary side, floating portion of primary side is extended and molten plastic is retracted due to decompression of the system.
Figure 24:
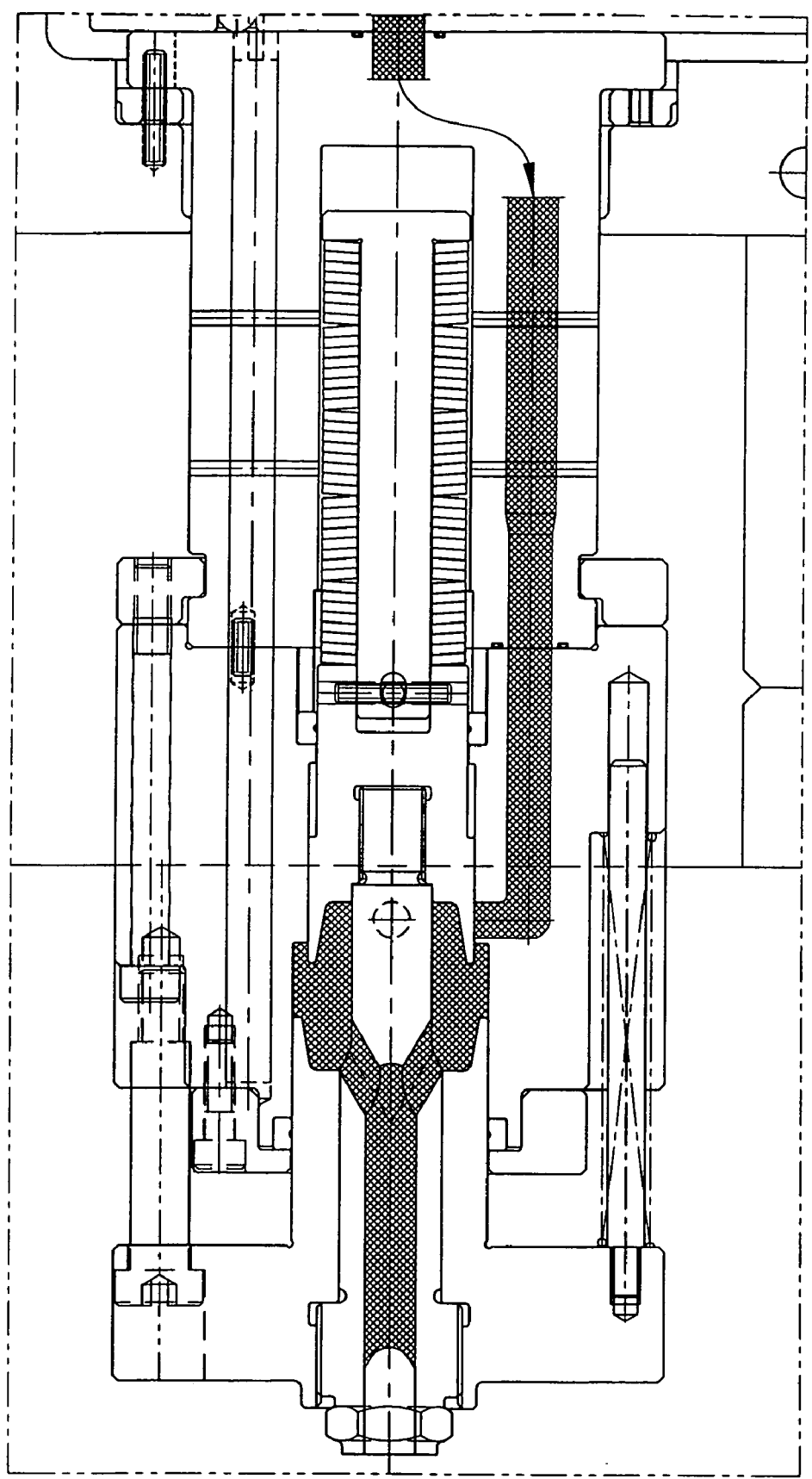
FIG. 24 is an enlarged detail of the primary side of FIG. 23.

With reference to FIG. 21, further components will now be described. On the primary side, flange 243 of the primary sprue bar 216, housed in a pocket 244 in feeder plate 202, is compressed between feeder manifold 214 on one side and a primary pressure ring 245, also housed in pocket 244, on opposite side. The primary sprue bar extension 218 is secured to primary sprue bar 216 with split-ring connectors 246 and bolts 247. A central hole 248 in body of primary sprue bar 216 houses stacks of spring washers 249, installed, with a controlled amount of compression, in parallel and in series, and centered by a spring washer compression pin 250, housed in same central hole 248. While flanged end of spring washer compression pin 250 is backed by bottom of hole 248, opposite end has a slot 251, shaped to allow sliding motion of a dowel pin 252, installed in fixed engagement, in back end of back floating sprue 220. Spring washers 249 are compressed between flanged end of compression pin 250 and back end of back floating sprue 220, constantly exerting pressure onto back floating sprue 220, which transfers it to contact surface between primary sprue shut-off valve 222 and secondary sprue shut-off insert 226. Back floating sprue 220 has two external portions: a back portion 253, in loose engagement in primary sprue bar 216, and a front portion 254, for centering in central hole 255 of primary sprue bar extension 218. Similarly, the front floating sprue 221 has a back portion 256, for centering in central hole 257 of primary sprue bar extension 218. Back portion 256 of front floating sprue 221 being larger than front portion 254 of back floating sprue 220, the injection pressures of transfer chamber 219 are pushing front floating sprue 221 forward when injection is process. Fine thread engagement 258 between back floating sprue 220 and primary sprue shut-off valve 222, and fine thread engagement 259 between front floating sprue 221 and primary sprue shut-off valve 222, transfer forward pressures of spring washers 249 and of transfer chamber 219 to the contact surface 260 between primary sprue shut-off valve 222 and secondary sprue shut-off insert 226. Also, a number of axial, peripherally acting forces are present around the system. These are provided by compression springs 261, installed with a controlled amount of compression, around spring guide pins 262, threadably engaged in the back of the flange portion 263 of front floating sprue 221. Compression springs 261, backed by fixed primary sprue bar extension 218, put constant pressure forward onto the back of the flange portion 263 of the front floating sprue 221. When mold opens to allow ejection of molded parts, the floating assembly is pushed away from the primary sprue bar extension (as previously mentioned) by compression springs 261. In conclusion, there are 3 sets of forward forces/pressures that transfer to surface of contact 260 between primary and secondary sides: the force of spring washers 249, the force of pressurized transfer chamber 219 (when plastic is injected), and the forces of compression springs 261. The axial motion freedom of the floating assembly is allowed by shoulder bolts 264, which connect flange portion 263 of the front floating sprue 221 in axial sliding contact with primary sprue bar extension 218.

Sealing means are provided throughout the system to prevent plastic leaks. On the primary side, metal seals 265 are installed in grooves around holes 217 at the contact surface between primary sprue bar 216 and feeder manifold 214. Metal seals 266 are also used to seal holes 217 between primary sprue bar 216 and primary sprue bar extension 218. Both back floating sprue 220 and front floating sprue 221 have thin annular profiles, 267 and 268 respectively, extending into transfer chamber 219. As transfer chamber 219 is filled, thin profiles deflect slightly under injection pressure, creating metal-to-metal sealing against holes 255 and 257. A back seal 269, held in place by a spacer 270, surrounds portion 253 of back floating sprue 220, to act as backup for seal of thin profile 267 against central hole 255. A front seal 271, held in place by a clamp ring 272 secured with bolts 273 to primary sprue bar extension 218, is used as backup seal between front floating sprue 221 and primary sprue bar extension 218. Both back seal 269 and front seal 271 can be made of a composite material, with high thermal resistance. On the secondary side, a metal seal 274 is used around inlet hole 233 of main manifold 215, to seal around secondary sprue 237 (see FIG. 25).

Figure 25:
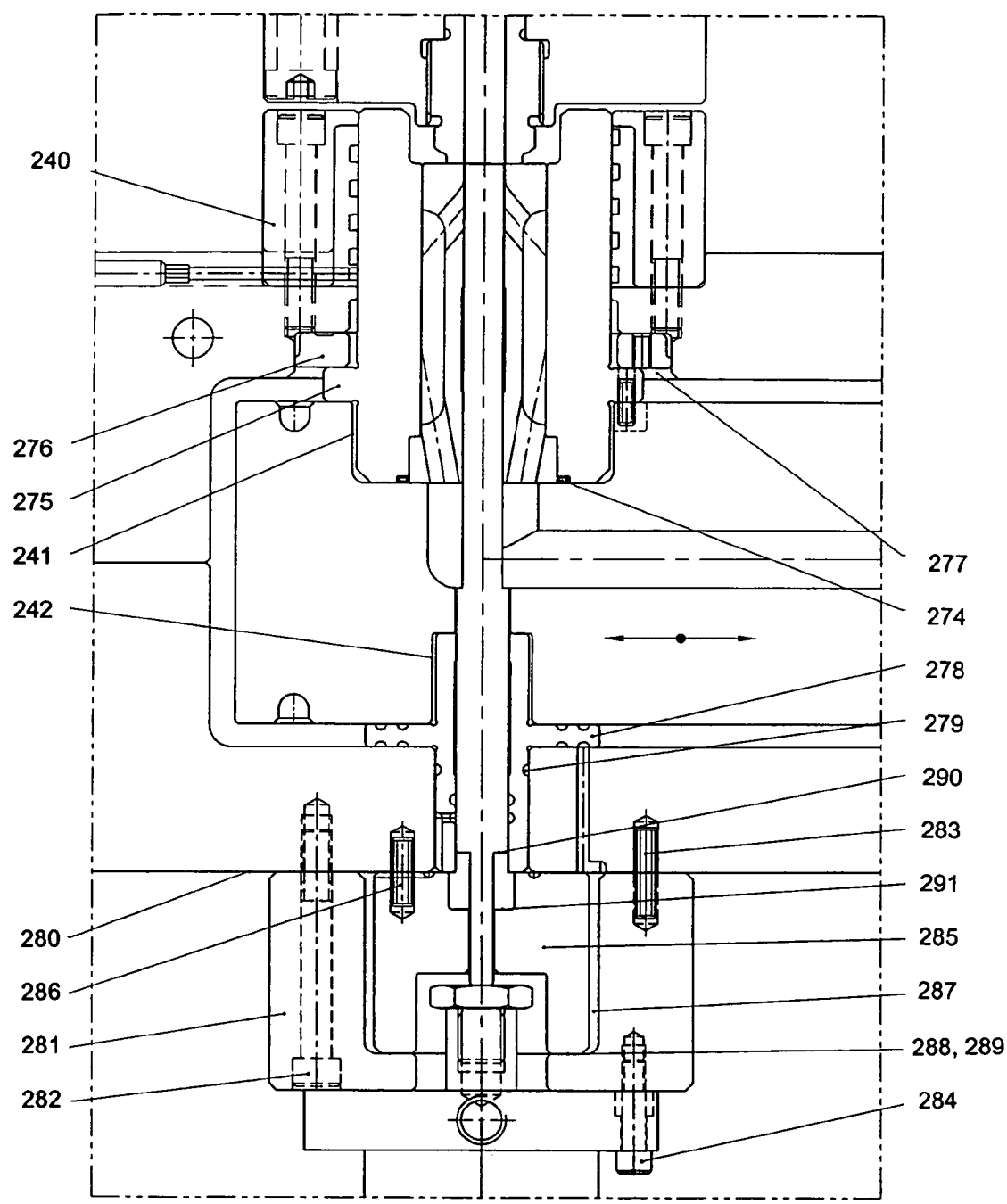
FIG. 25 is an enlarged detail of the secondary side of FIG. 20.

As shown in FIG. 25, on secondary side, flange 275 of secondary sprue 237 is pressed between main manifold 215 and a secondary pressure ring 276, installed in a pocket 277 in stationary manifold plate 206. On opposite side of main manifold 215, manifold sealing sleeve 239 having flange portion 278 pressed between main manifold 215 and moving manifold plate 207, seals against plastic leaks from the inlet hole 233, both at the bottom of pocket 242 and on both sides of flange 278. Manifold sealing sleeve 239 has a number of annular grooves 279 placed on the inside, outside, and on both sides of flange portion 278, which act as collector grooves for any leaks, directing them safely out of the system.

On surface 280 of moving manifold plate 207, a cylinder support 281 is secured with bolts 282 and located with dowel pins 283. Activating cylinder 229 is secured to cylinder support 281 with bolts 284. A valve stem stop 285 is located with dowel pins 286 in clearance pocket 287 inside cylinder support 281. Top surface 288 of valve stem stop 285 is pressed against surface 289 of cylinder support 281.

As previously mentioned, molten plastic flows through central hole 225 of secondary sprue shut-off insert 226, to reach radial holes 230, by pushing valve stem 227 back. Valve stem 227 is pushed back until flat surfaces 290 machined close to its back end (end which is in contact with T-coupling 228) come in contact with flat surfaces 291 of valve stem stop 285. A safety feature designed to protect the activating cylinder 229 from repeated shocks is provided by the positive stop of surfaces 290 on 291 takes place before piston of cylinder 229 reaches the end of its stroke. The shocks caused by injection pressures on valve stem 227 are transferred to surfaces 291 and not to activating cylinder 229. Furthermore, no retraction signal is necessary on activating cylinder 229; its "retract" inlet is used only as an exhaust. An advantage of the embodiment of FIGS. 19-25 is that it doesn't require synchronization with mold cycles.

With reference to FIG. 21, radial cooling holes 292 are provided through primary sprue bar 216, to allow air cooling of spring washers 249 in order to extend the life of these components.

The crossover nozzle system in accordance with the embodiments of the present invention has the following unique and advantageous features:

1. The crossover nozzle system is provided with two, symmetrically placed, inlet holes in the primary sprue bar, which are connected centrally to the transfer chamber in the primary sprue bar extension. Such symmetry allows central placement, around a singular axis, of all the components of the crossover nozzle system.

2. By removing shoulder bolts at the front of the primary side, the entire floating assembly, complete with spring washers and compression pin, can be removed from the crossover nozzle system for servicing, while mold in still in the injection press. This feature allows adjustments of the spring washers, alterations of their configuration, and modifications of the spring washer compression pin in order to modify the force output, without requiring removal of the entire crossover nozzle system from the mold. It is possible to increase or decrease the force output and deflection of the spring washers by altering their configuration. For example, stacking spring washers in parallel increases the force output, while stacking them in series increases the deflection.

3. During plastic injection, a substantial increase to the force output of spring washers is provided by the injection pressure of molten plastic in the transfer chamber between back floating sprue and front floating sprue, due to the outer size differential between back floating sprue and front floating sprue.

4. The thin annular profiles of the back floating sprue and the front floating sprue extending into the transfer chamber use the very force of injection as sealing means. These profiles are sufficiently thin to allow deflection and create metal-to-metal sealing all around walls of central holes of primary sprue bar extension.

5. A back seal and a front seal, which can be made of a different material (non-metal), are provided as backup for the metal-to-metal seals around transfer chamber.

6. The crossover nozzle system as described is adaptable to various mold heights. Adaptability is achieved by altering the length of the primary sprue bar. The primary sprue bar extension and the rest of the components of the crossover nozzle system will not need alterations.

7. When the mold opens and the floating assembly extends from the primary side, the thin annular profile of the back floating sprue acts as a shut-off surface against inlet holes opening into the transfer chamber. The transfer chamber is thus sealed from the inlet holes, to further prevent drooling until the system closes for a new mold cycle.

8. Being made of three main components, the floating assembly has the advantage of bringing different material characteristics to different requirement areas. The back floating sprue can be made of an alloy hard enough to withstand the forces of the spring washers, but soft enough not to score the inner walls of the primary sprue bar extension. The front floating sprue can be made of an alloy soft enough to avoid scoring the inner walls of the primary sprue bar extension, but having high thermal conductivity to allow proper heat transfer from cartridge heaters of the primary sprue bar extension to the front end of the primary sprue shut-off valve. The primary sprue shut-off valve is made of a high-hardened alloy, to withstand the constant beating at the contact surface with secondary sprue shut-off insert.

9. By unclamping the top plate from the stationary platen, with assistance of a hoist, the entire mold can be moved over (attached to the moving platen) for servicing the heaters in the injection machine.

10. Secondary side shut-off valve does not require a synchronizing signal from the mold, due to the constant forward action of the pneumatic cylinder. Such a design simplifies the construction and functionality of the system considerably, as the valve stem seals the opening on the secondary side automatically when decompression takes place, before the mold opens.

11. The secondary sprue shut-off insert separates the flow of molten plastic into multiple channels, then re-connects them as they enter the inlet of main manifold. Such a design creates a swirling motion of the molten plastic, washing off the inlet hole of the main manifold to prevent formation of dead spots (stale plastic).

12. The valve stem and the entire secondary side of crossover nozzle system can also be serviced while the mold is in the injection press.

A third alternate embodiment is shown described below in connection with FIGS. 26-32. According to one aspect of the third alternative embodiment of the present invention, the crossover nozzle system is a leak-proof mechanism that transfers molten plastic from the inlet at the center of the stationary platen of an injection machine, through a feeder manifold, to a main manifold of the stack mold, utilizing the injection pressures existent throughout the system and the thermal expansion of its various components to create a leak-proof seal.

Furthermore, according to another aspect of the third alternative embodiment of the present invention, the off-center crossover nozzle system has a primary side (attached to the stationary portion of the stack mold) and a secondary side (attached to the central portion of the stack mold), both sides of the system having movable components activated to close off the flow of molten plastic after each injection cycle. Activation of movable components is automatically timed in relation to the mold cycles without the use of dedicated synchronizing equipment, by way of preloaded springs and internal and external cylinders actuated continuously towards extending the movable components.

Yet another feature of this third alternative embodiment of the present invention, provides an hourglass portion (or other convergent-divergent profile) on both the primary and secondary sides of the crossover nozzle system, adjacent to their contact surface. Both hourglass portions are cooled by way of surrounding cooling circuits fed from the mold or externally from the machine. Cooling causes formation of skins of solidified plastic inside hourglass portions after each injection cycle. These skins substantially reduce the size of hourglass holes prior to mold opening to prevent drooling. Upon start of new cycle, newly injected plastic melts the skins on both sides of the opening, so that both hourglass portions are restored to their real sizes and flow of molten plastic goes on unrestricted.

These feature enable the crossover system to provide a leak-proof, off-center system that transfers molten plastic from the inlet at the center of the stationary platen of an injection machine to the main manifold located in the central portion of the stack mold. Furthermore, these features provide a crossover nozzle system having a drool-free opening to avoid spills and waste. In addition, these features provide a crossover nozzle system that achieves effective sealing of its opening from the pressurized flow channels to prevent plastic leaks.

Figure 26:
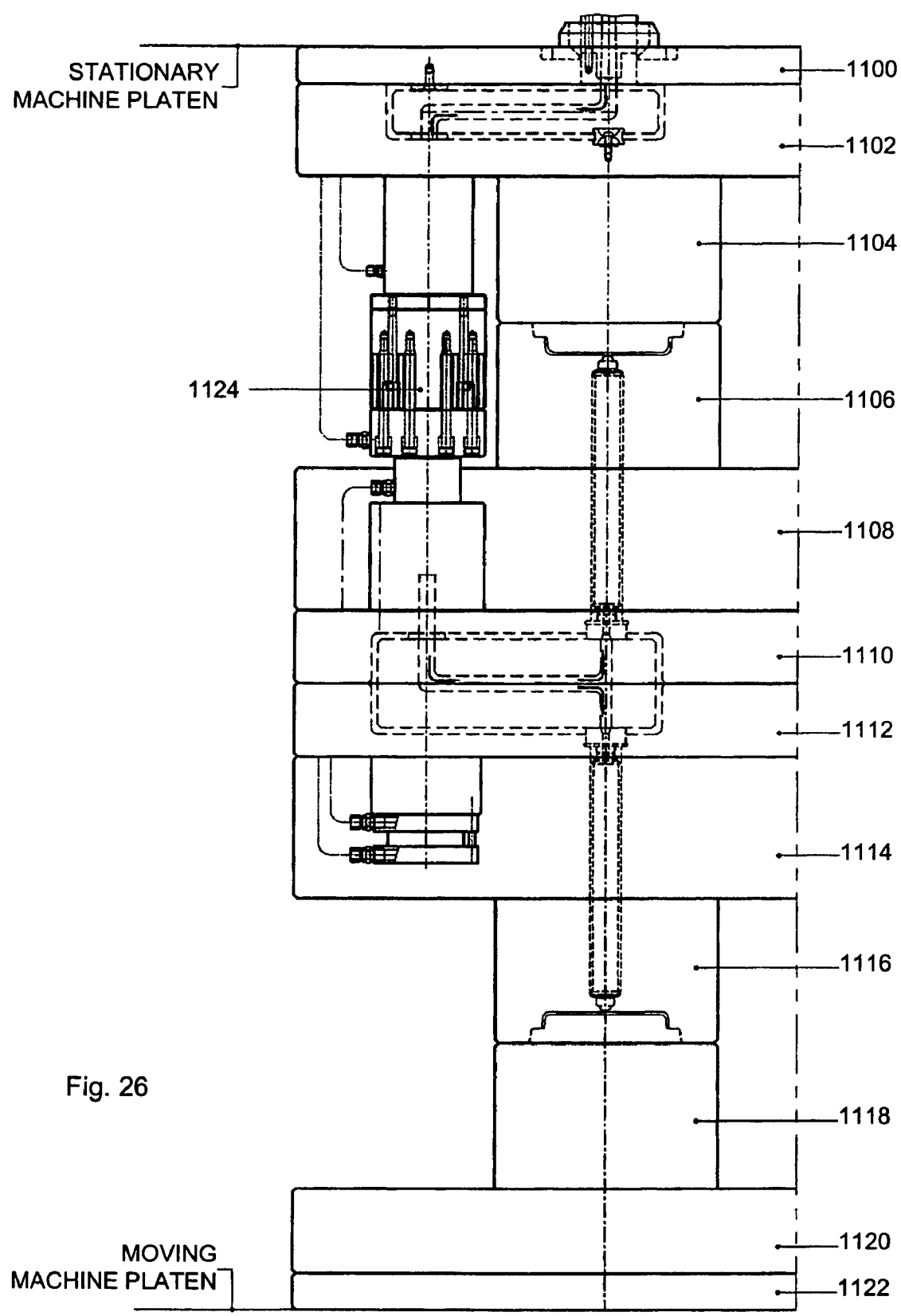
FIG. 26 is an exemplary partial view of a crossover nozzle system in accordance with a third alternative embodiment of the invention, shown within a closed stack mold.

Referring to FIG. 26, a stack mold in accordance with the invention comprises a top plate 1100, feeder plate/stationary core plate 1102, stationary core 1104, stationary cavity 1106, stationary cavity plate 1108, stationary manifold plate 1110, moving manifold plate 1112, moving cavity plate 1114, moving cavity 1116, moving core 1118, moving core plate 1120, a bottom plate 1122 and a crossover nozzle system 1124. It should be understood that fewer or more mold plates or blocks may be employed depending on specific design requirements.

As is typical of stack molds, the embodiment shown in FIG. 26 presents three main mold portions. A stationary core portion, secured onto the stationary machine platen, comprises top plate 1100, feeder plate 1102 and stationary core 1104. Similarly, a moving core portion, secured onto the moving machine platen, comprises bottom plate 1122, moving core plate 120 and moving core 1118. A central mold portion comprises stationary cavity 1106, stationary cavity plate 1108, stationary manifold plate 1110, moving manifold plate 1112, moving cavity plate 1114, moving cavity 1116 and all connecting components therein. The stationary core portion is completely stationary; the moving core portion opens for a double stroke, once per mold cycle, and the central portion, which rides on the machine tie bars or guide ways, opens for a full stroke, once per mold cycle. After each mold cycle, the mold portions move as described to release the molded parts, resulting in equal opening strokes on both sides of the central portion.

Figure 27:
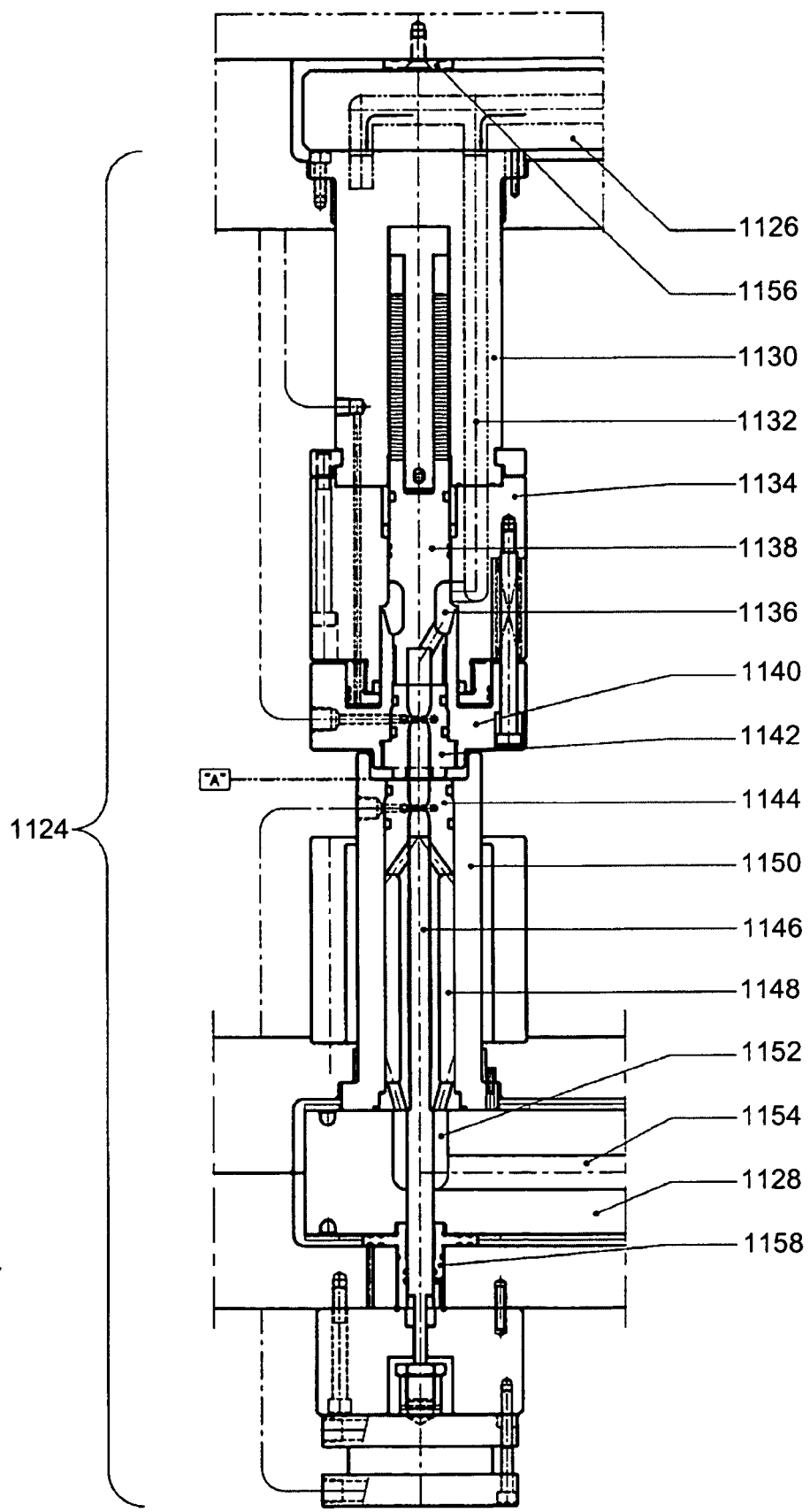
FIG. 27 is a section view of the crossover nozzle system of FIG. 26, shown with mold closed and ready for injection.
Figure 30:
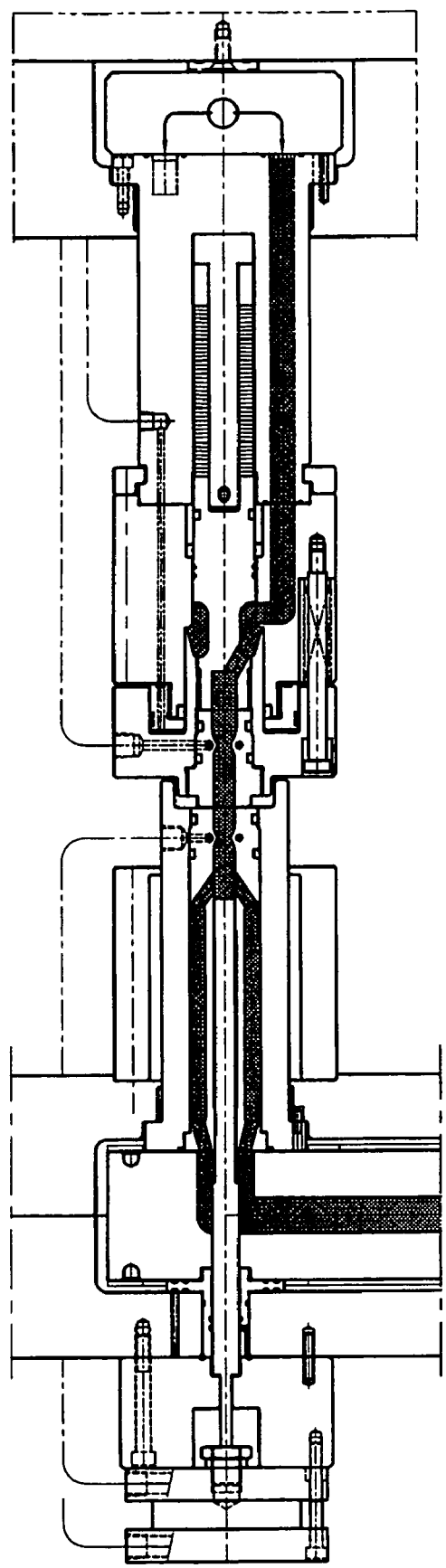
FIG. 30 is a section view of the crossover nozzle system of FIG. 27, shown during injection. Valve stem is retracted (valve is open) on the secondary side, allowing transfer of molten plastic to the main manifold.
Figure 31:
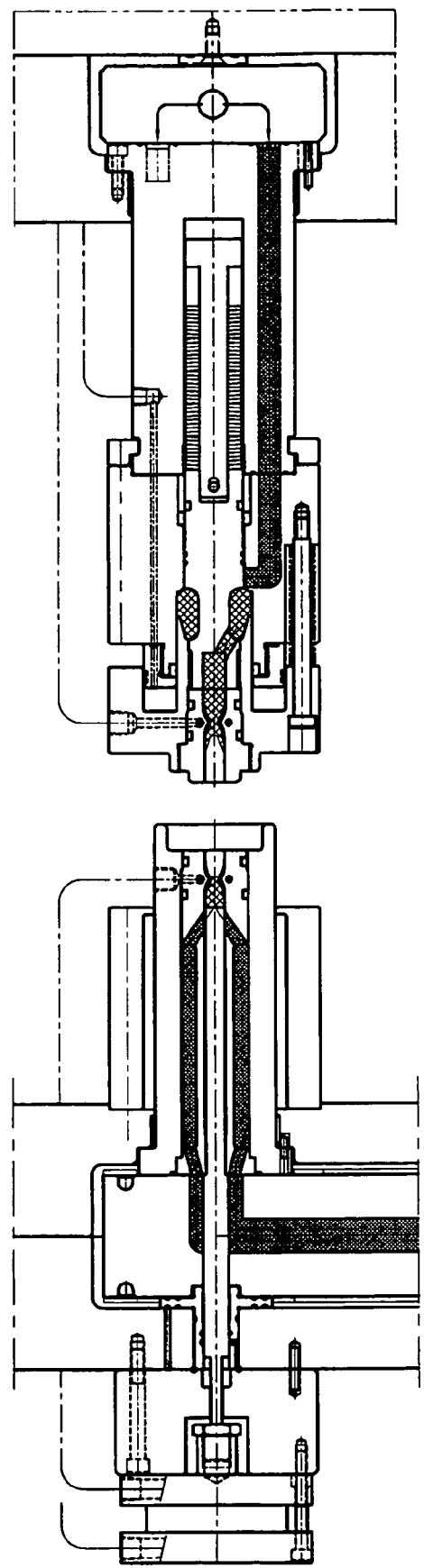
FIG. 31 is a section view of the crossover nozzle system of FIG. 27, shown with the mold open (between injection cycles). Valve stem is extended (valve is closed) on the secondary side, and molten plastic left on both sides of the opening is separated from the pressurized plastic in the flow channels.

With reference to FIG. 27, crossover nozzle system 1124 transfers molten plastic from a feeder manifold 1126 to a main manifold 1128 through a succession of components. From feeder manifold 1126, plastic enters a primary sprue bar 1130 through a number of symmetrically placed holes 1132. It continues on, through primary sprue bar extension 1134, into a transfer chamber 1136 formed between a back floating sprue 1138 and the back portion of a front floating sprue 1140, connected by threaded engagement. A primary sprue shutoff insert (or valve) 1142, installed in threaded engagement at the front end of the front floating sprue 1140, directs molten plastic into a secondary sprue shutoff valve (or insert) 1144 of the secondary side of the crossover nozzle system 124, by pushing back a valve stem 1146. When valve stem 1146 is pushed back fully (as shown in FIG. 30), molten plastic gains access to a number of side grooves 1148 formed between secondary sprue shutoff valve 1144 and a surrounding secondary sprue 1150, and is directed to an inlet hole 1152 of main manifold 1128, and to flow channels 1154 thereon, to reach all the injection chambers of the mold. Further components and features are presented below.

When the mold is closed and injection is in process, the crossover nozzle system is pressed between feeder manifold 1126 and main manifold 1128. A pressure pad 1156, located behind the feeder manifold 1126, in line with crossover nozzle system 1124, and a manifold sealing sleeve 1158, located behind the main manifold 1128 in surrounding relation to the valve stem 1146, allow transfer of injection pressures of the crossover nozzle system 1124 back to the mold plates and to the injection machine. The injection pressures present in the system and the thermal expansions of the various components work together to achieve an improved seal throughout the system and at the contact surface "A" between the primary and the secondary sides of the crossover nozzle system 1124. In addition, several other features are provided to achieve an improved seal and a drool-free opening at the end of each mold cycle, as described in detail below.

Figure 28:
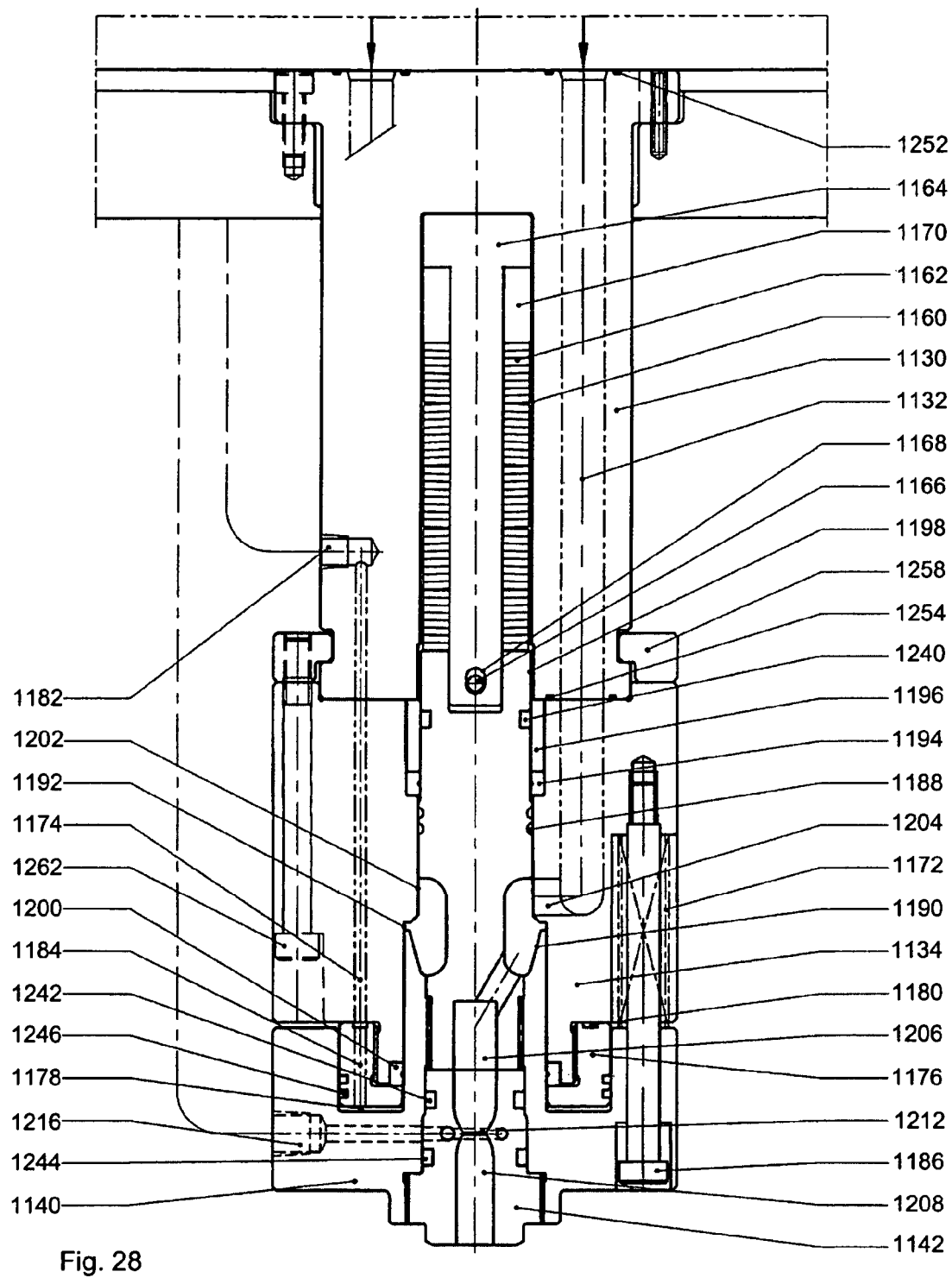
FIG. 28 is an enlarged section detail of the primary side of the crossover nozzle system of FIG. 27.

Referring to FIG. 27 and FIG. 28, in a central pocket 1160 of the primary sprue bar 1130 are stacked several sets of spring washers 1162. Spring washers shown are Belleville type, which are especially suited for high loads in small spaces. They are installed in a sequence of series and parallel, and are centered on a spring washer compression pin 1164. During injection, head of compression pin 1164 rests against bottom of pocket 1160, transferring injection pressures back to the injection machine. The opposite end of compression pin 1164 is secured to back end of back floating sprue 1138 in a loose connection, slidable for a short distance by way of a dowel pin 1166 and slot 1168. Spring washers 1162 are installed with a controlled amount of preload, to urge the floating assembly (formed by back floating sprue 1138, front floating sprue 1140, primary sprue shutoff insert 1142 and all their connecting components therein) against the secondary sprue shutoff valve 1144 at contact surface "A". The number of spring washers 1162 and their installation sequence can be varied to modify their force output or their deflection as desired (optionally, a spacer 1170 can be installed behind the spring packs). The stacking of spring washers in series increases the deflection in proportion to the number of washers, the load remaining the same as with a single washer. Stacking of spring washers in parallel increases the load (the force output), theoretically in proportion to the number of washers; however, practically this is not entirely true, since friction between washers creates an apparent hysteresis in the load-deflection curve. More information on spring washers is provided in technical catalogues of various manufacturers, which are commercially available.

Another extension force urging the floating assembly against the secondary side at contact surface "A" is provided by a number of compression springs 1172, installed circumferentially between primary sprue bar extension 134 and back of front floating sprue 1140. Compression springs 1172 are installed with a controlled amount of pre-compression, to automatically activate the floating assembly forward as soon as the mold starts to open, similar to spring washers 1162.

A built-in pneumatic cylinder 1174, located behind the floating assembly, provides yet another extension force urging the floating assembly against the secondary side. A clamp ring 1176, threadably secured to primary sprue bar extension 1134, is located in pocket 1178 formed at the back of front floating sprue 1140. An annular groove 1180 at the back of clamp ring 1176 directs pressurized air from an air supply 1182 to a number of circumferential holes 1184 connecting to bottom of pocket 1178. A combination of inner and outer seals prevents air escape from pocket 1178. Pressurized air is supplied continuously to pneumatic cylinder 1174, such that it automatically activates the floating assembly to extend as soon as mold starts to open. A benefit of such a design is that no additional system is required to synchronize the pneumatic cylinder with the mold cycles. Shoulder bolts 1186 limit the stroke of the floating assembly, while also acting as guide pins for compression springs 1172.

As soon as injection stops and mold starts to open, the floating assembly extends under the combined influence of the spring washers 1162, compression springs 1172 and built-in pneumatic cylinder 1174. These three features have a double role: to hold the floating assembly firmly pressed against the secondary side of the system during injection for a leak-proof process and to automatically extend the floating assembly as soon as the mold start to open, to seal flow channels and prevent drooling.

As can be seen in FIG. 28, back floating sprue 1138 has a pair of annular grooves 1188 behind transfer chamber 1136, while back end of front floating sprue 1140 has a thin annular extension 1190. Annular grooves 1188 collect any plastic leaks behind the transfer chamber 1136, while thin annular extension 1190 can flex slightly under injection pressure to achieve circumferential contact with front central hole 1192 of primary sprue bar extension 1134, creating a metal-to-metal seal at the front of transfer chamber 1136. A back seal 1194, held in place by a spacer 1196, surrounds the back end 1198 of back floating sprue 1138, to act as backup for seal of annular grooves 1188. A front seal 1200, held in place by clamp ring 1176, is used as backup for metal-to-metal seal of thin annular extension 1190.

Front central hole 1192 is larger than back central hole 1202 of primary sprue bar extension 1134, as can be seen clearly in FIG. 28. This diametric difference uses the injection pressure to further push the floating assembly forward for a leak-proof seal at contact surface "A".

The floating assembly stroke allowed by shoulder bolts 1186 is designed such that, when floating assembly is fully extended, the back end 1198 of back floating sprue 1138 completely covers inlet holes 1204 connecting to transfer chamber 1136. This separates the plastic left in the transfer chamber 1136 and in the front central holes 1206 (of back floating sprue 1138) and 1208 (of front floating sprue 1142) from the pressurized plastic of inlet holes 1132 and 1204, achieving a pressure reduction at the front of the primary side of the system. Extension of floating assembly also achieves a pullback of the plastic left in central holes 1206 and 1208, to reduce drool as the system opens.

With reference to FIGS. 28 and 30, primary sprue shutoff insert 1142 and secondary sprue shutoff valve 1144 have yet another feature designed to reduce drool of molten plastic during mold opening. Central hole 1208 of primary sprue shutoff insert 1142 and central hole 1210 of secondary sprue shutoff valve 1144 are provided with hourglass (or other convergent-divergent profiles) portions 1212 and 1214 respectively. Cooling circuits 1216 and 1218, fed externally from the mold or the injection machine, surround the hourglass portions to achieve cooling of the plastic left in holes 1208 and 1210 during mold opening. This plastic solidifies partially, forming skins 1220 and 1222 inside the hourglass portions, as shown in FIG. 32. The skins reduce the hourglass holes considerably, which further helps prevent drooling. As molten plastic is forced through the system for a new cycle, its high temperature helps melt the solidified skins, which are then reused, preventing formation of stale plastic in the system.

On the secondary side of the crossover nozzle system 1124, an activating cylinder 1224 (e.g. pneumatic) is secured onto a cylinder support 1226, itself mounted onto the stationary manifold plate 1112. Piston 1228 of activating cylinder 1224 is continuously activated to extend (the "extend" function is always on). The "retract" function of the cylinder is not used; the "retract" inlet works only as an exhaust. A T-coupling 1230, threadably engaged to piston 1228, is in loose connection with back end of valve stem 1146. T-coupling 230 and valve stem 1146 are not mechanically secured; that is not necessary since the "retract" function of the cylinder is not used and piston 1228 does not retract valve stem 1146. They are however maintained in contact, either by piston 1228 extending to close the valve, or by injection pressure pushing valve stem 1146 back to open the valve. Valve stem 1146 is pushed back until it bottoms out in pocket 1232 of cylinder support 1226. To protect the activating cylinder 1224 from damage due to repeated shocks, valve stem 1146 bottoms out in pocket 1232 before piston 1228 reaches the end of its stroke.

When injection pressures push valve stem 1146 back, molten plastic transferred through central holes 1208 and 1210 gains access to radial holes 1234, then to side grooves 1148 and, through radial holes 1236, to inlet hole 1152 of main manifold 1128. Any plastic leaks from inlet hole 1152 are collected by a number of annular grooves 1238 located on both sides of flange portion and on the inside and outside of manifold sealing sleeve 1158, and are drained externally.

Back seal 1194 and front seal 1200 can be made of a composite material, with high thermal resistance. Furthermore, a high-temperature seal 1240 is provided on back end 1198 of back floating sprue 1138, to act as backup for back seal 1194. On the primary side, high-temperature seals 1242 and 1244 seal around cooling circuit 1216, and a pair of high-temperature seals 1246 prevents air escape between front floating sprue 1140 and clamp ring 1176 from built-in pneumatic cylinder 1174. On the secondary side, high-temperature seals 1248 and 1250 seal around cooling circuit 1218.

Figure 29:
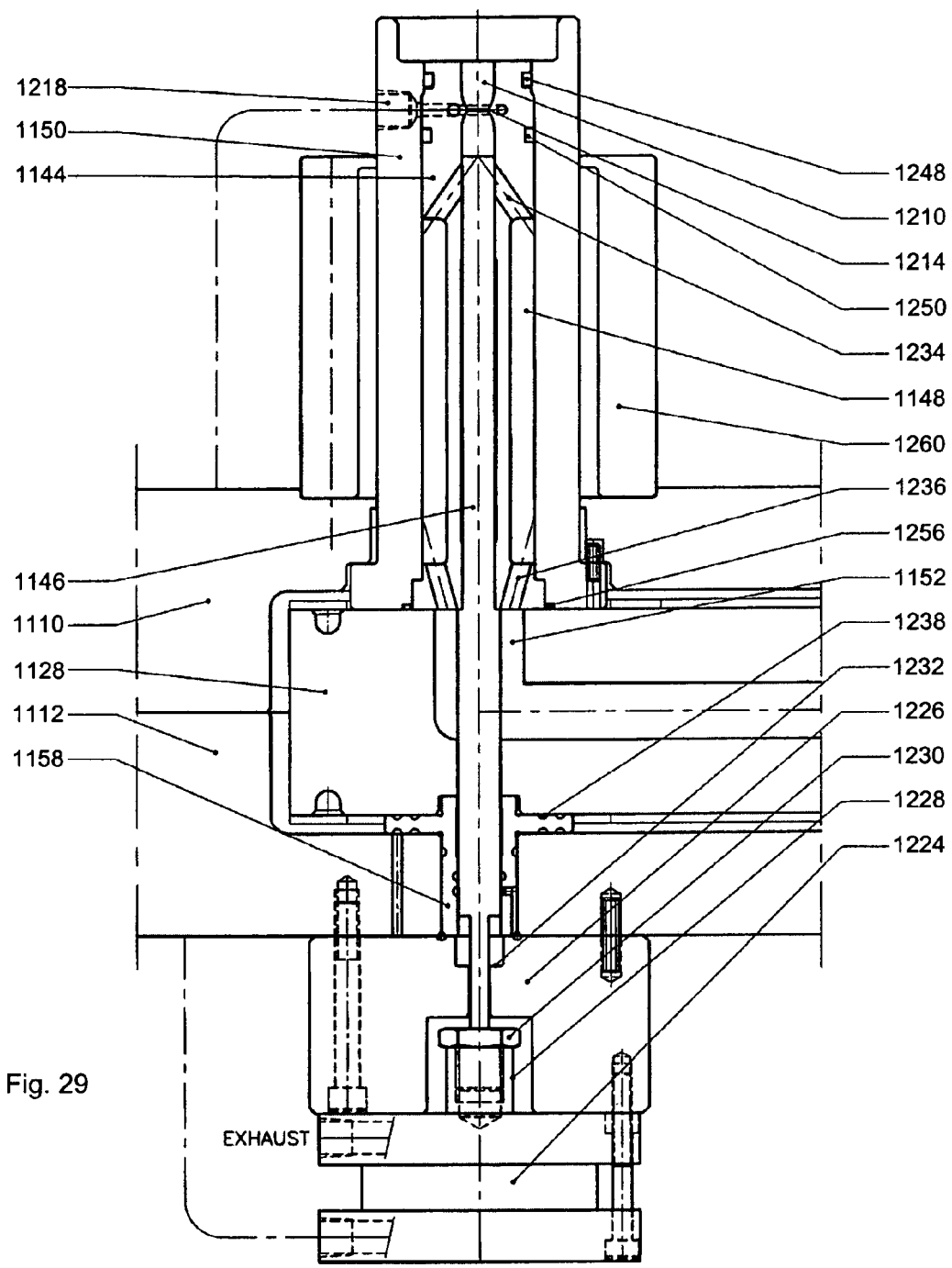
FIG. 29 is an enlarged section detail of the secondary side of the crossover nozzle system of FIG. 27.

Flow of molten plastic through the various components of the crossover nozzle system 1124 is sealed with metal o-rings, which are resistant to both high temperatures and high-pressures. With reference to FIG. 28, on the primary side holes 1132 are sealed by metal o-rings 1252 (between feeder manifold 1126 and primary sprue bar 1130) and metal o-rings 1254 (between primary sprue bar 1130 and primary sprue bar extension 1134). With reference to FIG. 29, on the secondary side metal o-ring 1256, located between secondary sprue 1150 and main manifold 1128, seals around inlet hole 1152.

An advantage of the embodiments of the present invention, from a mold operator's point of view, is that it allows servicing of the crossover nozzle system with little effort, while the mold remains in the machine. Removal of shoulder bolts 1186 allows the operator to simply pull out the entire floating assembly, complete with spring washers 1162 and compression pin 1164, while the primary sprue bar extension 1134 remains attached to the primary sprue bar 1130; this is useful since it gives the operator quick access to spring washers 1162 for any desired adjustments. Another advantage is that the length of the crossover nozzle system can be varied depending on mold stack height, without replacing the entire crossover nozzle system. As an example, the primary sprue bar extension 1134, floating assembly and secondary side can stay unchanged, while only the length of primary sprue bar 1130 can be varied. This is made possible by split-ring connectors 1258, which in the example shown are two halves of a connector ring; removal of bolts 1262 allows detachment of primary sprue bar extension 1134 from primary sprue bar 1130.

The primary side of the crossover nozzle system is heated by way of cartridge heaters (not shown in the drawings), as described above. The secondary side of the system is heated by a coil heater (not shown in the drawings), which is housed in a secondary sprue locating ring 1260, found in surrounding relation to secondary sprue 1150, similar to that described above.

The crossover nozzle system in general and that of the third alternative embodiment described above provides the following advantageous featues:

1. The built-in pneumatic cylinder of the primary side of crossover nozzle system provides a positive extension force urging the floating assembly to extend as soon as secondary side is retracted from contact at surface "A".

2. Continuous supply of pressurized air to built-in pneumatic cylinder (described at 1 above) achieves appropriate release (extension) of the floating assembly after each mold cycle, without use of any additional timing systems to synchronize the extension of floating assembly with the opening of the mold.

3. Extension of the floating assembly to its full stroke achieves sealing between the transfer chamber and the inlet holes, resulting in a pressure reduction at the front of the primary side of the system.

4. Extension motion of the floating assembly causes a pullback of the plastic left in the central hole of the primary sprue shutoff insert, to prevent plastic drool.

5. The design of primary side of the crossover nozzle system allows quick and easy removal of the floating assembly for service, while mold remains in the injection machine.

6. The two-piece design, having a back floating sprue and primary sprue shutoff insert, allows machining of hourglass portion (or other convergent-divergent profiles) at the front of the primary side of the system.

7. Cooling around the hourglass portion (or other convergent-divergent profiles) of the central hole of primary sprue shutoff insert causes formation of a skin that reduces size of hourglass hole, thus helping prevent plastic drool. Furthermore, with each new mold cycle, the newly injected plastic melts the existing skin and reuses it, to prevent formation of stale plastic.

8. The activating cylinder of the secondary side of the crossover nozzle system provides a continuous extension force urging the valve stem to close the valve as soon as injection stops.

9. The continuous supply to the "extend" inlet of the activating cylinder (described at 8 above) achieves appropriate release (extension) of the valve stem at the end of each mold cycle, without use of an additional timing systems to synchronize the extension of valve stem with the opening of the mold.

10. The extension of the valve stem separates the central hole of the secondary sprue shutoff valve from the pressurized plastic of the side grooves and the radial holes, achieving a pressure reduction at the front central hole to reduce plastic drool during opening of mold.

11. Cooling around the hourglass portion (or other convergent-divergent profiles) of the central hole of secondary sprue shutoff valve causes formation of a skin that reduces size of hourglass hole, thus helping reduce plastic drool. Furthermore, with each new mold cycle, the newly injected plastic melts the existing skin and reuses it, to prevent formation of stale plastic.

12. The crossover nozzle system as described is adaptable to various mold heights. Adaptability is achieved by altering the length of the primary sprue bar. The primary sprue bar extension, the floating assembly and the secondary side of the crossover nozzle system may not need to be altered.

13. The crossover nozzle system described is not limited to a 2-level stack mold. It can be adapted to 3-level and 4-level stack molds by utilizing different design configurations, while maintaining the overall concept of crossover nozzle system.

As will be understood by those skilled in the art, the present invention may be embodied in other specific forms without departing from the essential characteristics thereof. These other embodiments are intended to be included within the scope of the present invention, which is set forth in the following claims.

What is claimed is:

1. A crossover nozzle system for transferring molten plastic from a feeder manifold to a main manifold of the molding chambers of the stack molds of an injection molding machine, wherein the centerline of the molding chambers coincides with the centerline of the stack molds, the system comprising:
   a primary sprue bar in fluid communication with the feeder manifold;
   an aperture in the primary sprue bar, the aperture in fluid communication with the feeder manifold;
   a primary sprue bar extension adjustably connected with the primary sprue bar and an aperture in the primary sprue bar extension being in fluid communication with the aperture in the primary sprue bar;
   a floating sprue connected with the primary sprue bar extension;
   a primary sprue valve connected with the floating sprue and in fluid communication with the primary sprue bar extension;
   a secondary sprue located in the main manifold and connected with the floating sprue;
   a secondary sprue valve slidably located within the secondary sprue and in fluid communication with the primary sprue valve;
   an extension rod connected with the secondary valve for activating the secondary sprue valve;
   an extension rod activating cylinder having a piston connected with the extension rod; and
   an activating mechanism comprising a primary sprue valve activating cylinder which is coupled with the primary sprue valve and is configured for activating the primary sprue valve.

2. The crossover nozzle system of claim 1 wherein the primary sprue bar extension is connected with the primary sprue bar by a split-ring connector and a bolt.

3. The crossover nozzle system of claim 1 wherein the aperture in the primary sprue bar is one of a set of symmetrically disposed apertures in the primary sprue bar and which apertures are positioned and dimensioned to balance the injection pressures of the molten plastic.

4. The crossover nozzle system of claim 1 wherein the inner surface of the primary sprue valve comprises spiral grooves which are configured and dimensioned to create a swirling motion of the molten plastic, so as to minimize the formation of stale plastic.

5. The crossover nozzle system of claim 1 wherein the secondary sprue is connected with the floating sprue along a portion of a spherical surface.

6. The crossover nozzle system of claim 5 wherein the primary sprue valve and the secondary sprue valve are configured to be in contact along a contact spherical surface of equal radius as the spherical surface of contact between the secondary sprue and the floating sprue.

7. The crossover nozzle system of claim 6 wherein the secondary sprue valve comprises an outer cone, and the secondary sprue comprise an inner cone which surrounds the outer cone of the secondary sprue valve.

8. The crossover nozzle system of claim 7 wherein the secondary sprue comprises grooves adjacent to the outer cone of the secondary sprue valve, which grooves are dimensioned to lead molten plastic away from the spherical surface of contact between the secondary sprue and the floating sprue.

9. The crossover nozzle system of claim 1 wherein the primary sprue valve and the secondary sprue valve are movable portions within the crossover nozzle system, extending/retracting once per mold cycle, so as to allow/restrict the flow of molten plastic from the feeder manifold to the main manifold of an injection molding machine.

10. The crossover nozzle system of claim 1 wherein the primary sprue valve activating cylinder is synchronized with the mold cycles of the injection molding machine.

11. The crossover nozzle system of claim 1 wherein the primary sprue valve activating cylinder is located away from the heated areas of the injection molding machine.

12. The crossover nozzle system of claim 1 wherein the activating mechanism comprises a pair of levers dimensioned and positioned to maintain the primary sprue valve in contact with the secondary sprue valve, and the floating sprue in contact with the secondary sprue along spherical surface of contact between the secondary sprue and the floating sprue.

13. The crossover nozzle system of claim 1 wherein the inner surface of the secondary sprue valve comprises spiral grooves which are configured and dimensioned to create a swirling motion of the molten plastic, so as to minimize the formation of stale plastic.

14. The crossover nozzle system of claim 1 comprising grooves formed on the inner surface of the secondary sprue and grooves formed on the outer surface of the secondary sprue valve, which grooves of the inner surface of the secondary sprue and the grooves of the outer surface of the secondary sprue valve are configured to align to achieve a decompression for the opening of the stack molds of the injection molding machine.

15. The crossover nozzle system of claim 1 wherein the extension rod activating cylinder is constantly activated to extend the valve stem of the secondary sprue valve towards the primary sprue valve.

16. The crossover nozzle system of claim 15 wherein the extension rod comprises a flat surface at its end which is connected with the extension rod activating cylinder, the flat surface is surrounded by a pocket, and wherein the travel of the extension rod is limited when the flat surfaces of the extension rod comes in contact with the pocket.

17. A crossover nozzle system for transferring molten plastic from a feeder manifold to a main manifold of the molding chambers of the stack molds of an injection molding machine, wherein the centerline of the molding chambers coincides with the centerline of the stack molds, the system comprising:

a primary sprue bar in fluid communication with the feeder manifold;

an aperture in the primary sprue bar, the aperture in fluid communication with the feeder manifold;

a primary sprue bar extension adjustably connected with the primary sprue bar and an aperture in the primary sprue bar extension being in fluid communication with the aperture in the primary sprue bar;

a transfer chamber in fluid communication with the aperture in the primary sprue bar extension, the transfer chamber formed between a back floating sprue and a front floating sprue;

a primary sprue shut-off valve centered and connected with the front floating sprue, wherein fluid communication is configured to allow the molten plastic to flow from the transfer chamber through one or more radial holes to a central hole in the body of primary sprue shut-off valve;

a secondary sprue shut-off insert having a central aperture, in fluid communication with the primary shut-off valve;

a secondary sprue surrounding the secondary sprue shut-off insert;

a valve stem slidably engaging the secondary sprue shut-off insert; and a valve stem activating cylinder having a piston which is coupled with the valve stem, wherein the primary sprue bar, the primary sprue bar extension, the transfer chamber, the back floating sprue and the front floating sprue form parts of a primary side of the crossover nozzle system, and wherein the secondary sprue shut-off insert, and the secondary sprue forms parts of a secondary side of the crossover nozzle system.

18. The crossover nozzle system of claim 17 wherein the difference between the outer diameter of the main cylindrical portion of the back floating sprue and outer diameter of the main cylindrical portion of the front floating sprue is dimensioned to allow for an increased pressure to be exerted on the front floating sprue, which in turn transfers the increased pressure to the primary sprue shut-off valve.

19. The crossover nozzle system of claim 17 wherein the aperture in the primary sprue bar is one of a set of symmetrically disposed apertures in the primary sprue bar and which apertures are positioned and dimensioned to balance the injection pressures of the molten plastic.

20. The crossover nozzle system of claim 17 wherein the aperture in the sprue bar is a part of two, symmetrically placed, inlet holes in the primary sprue bar, which are connected centrally to the transfer chamber in the primary sprue bar extension.

21. The crossover nozzle system of claim 17 wherein the front floating sprue, the primary shut-off valve, and the back floating sprue in part form a floating assembly, wherein the floating assembly is removable as a unitary assembly.

22. The crossover nozzle system of claim 17 wherein the primary sprue bar extension is connected with the primary sprue bar by a split-ring connector and a bolt.

23. The crossover nozzle system of claim 17 wherein a central hole in the body of the primary sprue bar houses stacks of spring washers, installed, and centered by a spring washer compression pin, housed in the same central hole.

24. The crossover nozzle system of claim 23 wherein the stacks or springs are stalled in parallel and in series.

25. The crossover nozzle system of claim 23 wherein the front floating sprue, the primary shut-off valve, the back floating sprue, the primary sprue bar and the central hole in the body of the primary sprue bar which houses stacks of spring washers in part form a floating assembly, wherein the floating is configured to spring towards the secondary side of the crossover nozzle system, causing the back floating sprue to seal off fluid communication from the main runner.

26. The crossover nozzle system of claim 24 further comprising a built-in pneumatic cylinder as a part of the primary side of crossover nozzle system, wherein the built-in pneumatic cylinder provides a positive extension force urging the floating assembly to extend when the secondary side is retracted from contact at the surface between the primary side and the secondary sides of the crossover system.

27. The crossover nozzle system of claim 26 wherein a continuous supply of pressurized air to the built-in pneumatic cylinder achieves an appropriate release and extension of the floating assembly after each mold cycle, without use of an additional timing systems to synchronize the extension of floating assembly with the opening of the mold.

28. The crossover nozzle system of claim 17 comprising one or more compression springs installed around spring guide pins, which pins are threadably engaged in the front floating sprue, where the compression springs are backed by the primary sprue bar extension, and the compression springs are dimensioned to place a pressure forward onto the front floating sprue, so as to minimize leaks between the primary and the secondary sides of the crossover nozzle system.

29. The crossover nozzle system of claim 28 wherein the one or more compression springs are circumferentially-placed around the front floating sprue.

30. The crossover nozzle system of claim 17 wherein the back floating sprue and the front floating sprue have thin annular profiles, extending into the transfer chamber, and are formed and dimensioned such that as the transfer chamber is filled with molten plastic, the thin profiles deflect slightly under injection pressure, creating a metal-to-metal sealing against their surrounding surfaces.

31. The crossover nozzle system of claim 30 comprising a back seal, held in place by a spacer, where the seal and the spacer surround an axial portion of the back floating sprue, so as provide a backup for the metal-to-metal seal formed by the thin annular profiles.

32. The crossover nozzle system of claim 17 comprising a back seal, held in place by a spacer, where the seal and the spacer surround an axial portion of the back floating sprue.

33. The crossover nozzle system of claim 32 wherein the back seal is made of a composite material, with a high thermal resistance.

34. The crossover nozzle system of claim 17 comprising a front seal, held in place by a clamp ring secured with bolts to the primary sprue bar extension, where the front seal is used as a seal between the front floating sprue and the primary sprue bar extension.

35. The crossover nozzle system of claim 34 wherein the front seal is made of a composite material, with a high thermal resistance.

36. The crossover nozzle system of claim 17 wherein the valve stem activating cylinder is constantly activated to extend the valve stem towards the primary sprue shut-off valve.

37. The crossover nozzle system of claim 17 wherein the valve stem comprises a flat surfaces near its back end which is closer to the activating cylinder and which is configured to engage a flat surface of a valve stem stop which surround the valve stem, so as to limit the travel of the valve stem prior to the piston reaching the end of its stroke.

38. The crossover nozzle system of claim 17 wherein the valve stem and the piston of the activating cylinder are not mechanically secured to one-another, so as to minimize heat transfer from the valve stem to the piston.

39. The crossover nozzle system of claim 17 wherein the activating cylinder is located on the outside of a manifold plate of an injection molding machine.

40. The crossover nozzle system of claim 17 wherein the force provided by the cylinder on the valve stem is overcome by the injection pressure of the molten plastic.

41. The crossover nozzle system of claim 17 wherein the central hole of primary sprue shutoff valve and central hole of secondary sprue shutoff insert comprise an hourglass-shaped flow passages.

42. The crossover nozzle system of claim 41 comprising cooling circuits, fed externally from the mold or the injection machine, surround the hourglass portions to achieve cooling of the plastic left in the central holes during mold opening.

* * * * *